(12) United States Patent
Abe et al.

(10) Patent No.: US 9,827,620 B2
(45) Date of Patent: Nov. 28, 2017

(54) HEAD REPLACEMENT-TYPE CUTTING TOOL

(75) Inventors: Taro Abe, Akashi (JP); Yoshihiko Kimura, Akashi (JP); Takayuki Azegami, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 1280 days.

(21) Appl. No.: 14/352,174

(22) PCT Filed: Oct. 17, 2011

(86) PCT No.: PCT/JP2011/073817
§ 371 (c)(1),
(2), (4) Date: Jun. 19, 2014

(87) PCT Pub. No.: WO2013/057776
PCT Pub. Date: Apr. 25, 2013

(65) Prior Publication Data
US 2014/0308082 A1    Oct. 16, 2014

(30) Foreign Application Priority Data
Sep. 29, 2010 (JP) .................................. 2010-218704

(51) Int. Cl.
*B23B 51/00* (2006.01)
*B23C 5/10* (2006.01)
*B23B 31/11* (2006.01)

(52) U.S. Cl.
CPC ............ *B23C 5/10* (2013.01); *B23B 31/1122* (2013.01); *B23C 2210/02* (2013.01);
(Continued)

(58) Field of Classification Search
CPC ... B23C 5/10; B23C 2210/03; B23C 2210/02; B23C 2240/32; B23C 5/26; B23B 31/1122; B23B 31/1115
(Continued)

(56) References Cited

U.S. PATENT DOCUMENTS 1,407,335 A * 2/1922 Reynolds ............ B23B 31/1107
279/100
3,047,316 A * 7/1962 Wehring ............... E21B 17/042
285/334
(Continued)

FOREIGN PATENT DOCUMENTS

CN 1446665 A 10/2003
EP 0661123 A1 7/1995
(Continued)

OTHER PUBLICATIONS

Office Action dated Jun. 3, 2015, issued for the Chinese patent application No. 201180074043.9 and partial English translation of search report.
(Continued)

*Primary Examiner* — Sara Addisu
(74) *Attorney, Agent, or Firm* — Locke Lord LLP

(57) ABSTRACT

A head replacement-type cutting tool having a holder provided at the attachment hole with the fitting part formed in a tapered shape, and the leading end face is perpendicular to the central axis. The attachment part formed in a tapered shape protrudes on the cutting head from the rear end face perpendicular to the central axis of the cutting part. The cutting head is attached to the holder in such a manner that the attachment part is fitted into the fitting part by screwing the female thread part with the male thread part and the leading end face is in contact with the rear end face. The inner diameter to outer diameter ratio d/D1 which is a ratio of the inner diameter d of the fitting part before being fitted
(Continued)

in relation to the outer diameter D1 of the leading end part of the holder is from 0.5 to 0.8.

16 Claims, 10 Drawing Sheets

(52) U.S. Cl.
CPC ...... *B23C 2210/03* (2013.01); *B23C 2240/32* (2013.01); *Y10T 407/1914* (2015.01)

(58) Field of Classification Search
USPC .................. 408/226, 233, 231, 238, 239 R
See application file for complete search history.

(56) References Cited

U.S. PATENT DOCUMENTS

| | | | | |
|---|---|---|---|---|
| 5,114,286 | A * | 5/1992 | Calkins | B23B 31/11 408/226 |
| 5,496,137 | A * | 3/1996 | Ochayon | B22F 5/06 408/226 |
| 5,624,213 | A * | 4/1997 | Anderson | B23B 51/0473 144/23 |
| 5,899,642 | A * | 5/1999 | Berglow | B23B 31/11 279/8 |
| 5,971,670 | A * | 10/1999 | Pantzar | B23B 31/1107 407/119 |
| 6,030,004 | A * | 2/2000 | Schock | F16B 33/02 285/333 |
| 6,394,711 | B1 * | 5/2002 | Brosius | B23C 5/10 279/8 |
| 6,485,220 | B2 * | 11/2002 | Hecht | B23B 31/11 403/343 |
| 2001/0041089 | A1 * | 11/2001 | Hecht | B23B 31/11 403/343 |
| 2002/0021945 | A1 * | 2/2002 | Harpaz | B23B 31/11 407/53 |
| 2003/0068209 | A1 * | 4/2003 | Leibhard | E21B 10/58 408/231 |
| 2003/0210963 | A1 * | 11/2003 | Kakai | B23B 31/008 408/231 |
| 2006/0072977 | A1 * | 4/2006 | Jonsson | B23B 31/1107 408/233 |
| 2006/0073744 | A1 * | 4/2006 | Jonsson | B23B 31/11 439/884 |
| 2006/0257215 | A1 * | 11/2006 | Kakai | B23B 31/11 407/101 |
| 2007/0196188 | A1 | 8/2007 | Hecht et al. | |
| 2007/0248421 | A1 * | 10/2007 | Kakai | B23B 31/1107 407/34 |
| 2008/0304923 | A1 * | 12/2008 | Lehto | B23B 31/005 407/100 |
| 2012/0093602 | A1 * | 4/2012 | Osawa | B23B 31/005 408/239 R |
| 2013/0028669 | A1 * | 1/2013 | Cigni | B23C 5/10 407/11 |
| 2013/0272806 | A1 * | 10/2013 | Guay | B23C 5/10 407/11 |
| 2014/0056658 | A1 * | 2/2014 | Maeda | B23C 5/109 407/40 |
| 2015/0016905 | A1 * | 1/2015 | Haimer | B23B 31/1115 408/57 |
| 2015/0063928 | A1 * | 3/2015 | Maeda | B23C 5/10 407/42 |
| 2015/0151365 | A1 * | 6/2015 | Haimer | B23B 31/1107 279/99 |
| 2015/0202690 | A1 * | 7/2015 | Haimer | B23B 31/1115 279/99 |
| 2015/0217380 | A1 * | 8/2015 | Haimer | B23B 31/005 279/99 |
| 2015/0314379 | A1 * | 11/2015 | Sharivker | B23C 5/10 407/34 |
| 2015/0360295 | A1 * | 12/2015 | Haimer | B23B 31/1115 279/20 |

FOREIGN PATENT DOCUMENTS

| | | |
|---|---|---|
| JP | 2001-500801 A | 1/2001 |
| JP | 2001-239418 A | 9/2001 |
| JP | 2001-252814 A | 9/2001 |
| JP | 2001-252815 A | 9/2001 |
| JP | 2004-098272 A | 4/2004 |
| JP | 2006-150508 A | 6/2006 |
| JP | 2006-150509 A | 6/2006 |
| JP | 2007-216378 A | 8/2007 |
| JP | 2009-527368 A | 7/2009 |
| JP | 2011-062787 A | 3/2011 |
| JP | 2011-143532 A | 7/2011 |
| WO | WO-98/13161 A1 | 4/1998 |
| WO | WO-2007/096861 A1 | 8/2007 |
| WO | WO-2010/143315 A1 | 12/2010 |

OTHER PUBLICATIONS

International Search Report dated Nov. 8, 2011, issued for PCT/JP2011/073817.
Notice of Allowance dated Jan. 28, 2014, issued for the Japanese patent application No. 2010-218704.
Search Report dated Apr. 28, 2015, issued for the European patent application No. 11874305.3.

* cited by examiner (a)

(c)　　　　　　　(b)

HEAD REPLACEMENT-TYPE CUTTING TOOL

TECHNICAL FIELD

The present invention relates to a head replacement-type cutting tool in which a replacement-type cutting head having a cutting part is attached in a detachable manner to a holder for the head replacement-type cutting tool.

DESCRIPTION OF THE RELATED ART

As the above-described head replacement-type cutting tool, Patent Document 1 discloses a head replacement-type end mill which is an end mill having a cutting part firmly attached in a detachable manner to a main body, in which the cutting part is provided at one end around a shaft with a cutting edge part and at the other end with a tapered shaft part, an end diameter of the tapered shaft part is smaller than an edge diameter of the cutting part, the tapered shaft part is 1/50 or less in taper rate, the cutting part is taper-fitted into the main body and firmly attached thereto, the main body is composed of an adaptor part and a shank part, the adaptor part is made of a cemented carbide prepared by using WC (tungsten carbide) with an average particle diameter of 3 microns or more and tapered to the shank side at an inclination of 5 degrees or less in an increasing manner.

Further, Patent Document 1 discloses that the cutting part is made of the cemented carbide of ultrafine particles and the shank part is made of the cemented carbide equivalent to JIS K30. It also discloses that the cutting part is provided between the cutting edge part and the tapered shaft part with an intermediate part having a maximum diameter equal to a diameter of the leading end of the main body, the cutting part and the main body are constituted in such a manner that a fillet of the cutting part is butted against an end face of the leading end of the main body substantially at a right angle with respect to a tool axis, thus making it possible to transfer a sufficient cutting torque from the main body to the cutting part via a boundary plane between them, even if the tapered shaft part is loosely fitted with respect to the main body.

PRIOR ART DOCUMENT

Patent Document

Patent Document 1: Japanese Unexamined Patent Application, First Publication No. 2001-252814

SUMMARY OF THE INVENTION

Problems to be Solved by the Invention

Moreover, in the head replacement-type cutting tool disclosed in Patent Document 1, the cutting part is taper-fitted only by press-fitting the tapered shaft part into the tapered hole part of the adaptor part and free from any detent such as a key. Therefore, cutting torque acting on the cutting part is to be received by a frictional force between the tapered shaft part and the tapered hole part as well as a frictional force between the fillet (butted face) of the cutting part and the end face of the leading end of the main body. However, the coefficient of friction is low between the cemented carbide which forms the cutting part and the main body (adaptor part). For example, where a twisted edge is used to carry out cutting at high loads, the cutting head may be pulled out or the cutting head may rotate loosely due to a reduction in pressure on the end face if not pulled out.

On the other hand, in order to deal with the cutting torque on high-load cutting, it is necessary for the tapered shaft part to be press-fitted into the tapered hole part at a high pressure so as to increase the contact pressure between the tapered shaft part and the tapered hole part. However, when the tapered shaft part is press-fitted into the tapered hole part at a high pressure, a high tensile stress is applied to an inner circumferential face of the tapered hole part in a circumferential direction. Therefore, if the adaptor part at which the tapered hole part is formed is made of the cemented carbide which is a fragile material as described above, the part may be broken even where it is made of the cemented carbide relatively high in ductility, for example, with an average particle diameter of WC which is 3 μm or more.

The present invention has been made in view of the above-described background, an object of which is to provide a head replacement-type cutting tool which is capable of reliably holding a cutting head on high-load cutting without breakage of a holder, even if a cutting head is fitted into the holder and thus fitted parts are, as described above, made of the cemented carbide with a low coefficient of friction.

Means for Solving the Problems

The head replacement-type cutting tool of the present invention is a head replacement-type cutting tool which is provided with a cutting head having a cutting part and a holder which has a cylindrical leading end part and in which the cutting head is to be attached in a detachable manner to an attachment hole formed on the leading end part of the holder, wherein a fitting part is formed on the attachment hole so as to be in a tapered shape which gradually increases in the inner diameter as close to an opening part of the attachment hole, a peripheral border of the opening part on a leading end face of the holder is perpendicular to a central axis of the attachment hole, at least the leading end face and the fitting part of the holder are made of a cemented carbide, a taper-shaped attachment part fitted to the fitting part is formed on the cutting head so as to protrude from a rear end face of the cutting part and to be coaxial with the central axis, the rear end face of the cutting part is perpendicular to the central axis, at least the attachment part of the cutting head and the rear end face of the cutting part are made of the cemented carbide, the cutting head is attached to the holder in such a manner that a male thread part and a female thread part installed respectively are engaged with each other at the center of the central axis thereby the attachment part is fitted into the fitting part, and the leading end face is in contact with the rear end face, an inner diameter to outer diameter ratio d/D1 which is a ratio of an inner diameter d of the fitting part at the opening part of the attachment hole in a state before the attachment part is fitted into the fitting part in relation to an outer diameter D1 of the leading end part of the holder is in a range of 0.5 to 0.8, and an outer diameter expansion percentage (D2−D1)/D1×100 (%) satisfies, $$0.022 \times \frac{d}{D1} - 0.003(\%) \leq \frac{D2-D1}{D1} \times 100(\%) \leq 0.33 \times \frac{d}{D1} - 0.06(\%)$$

wherein D1 is the outer diameter of the leading end part of the holder before the attachment part is fitted into the fitting part, and D2 is the outer diameter of the leading end part of the holder in a state where the attachment part is fitted into the fitting part and the cutting head is attached to the holder.

In the thus constituted head replacement-type cutting tool, the cutting head is attached to the holder in such a manner that, as described above, the male thread part is screwed with the female thread part, by which the attachment part and the fitting part, each formed in a tapered shape, are taper-fitted and the leading end face of the holder is in contact with the rear end face of the cutting part, that is, they are attached by what is called a two face restraint. At this time, the male thread part is screwed with the female thread part to draw the attachment part into the attachment hole, thus making it possible to secure a great contact pressure between the inner circumferential face of the fitting part and the outer circumferential face of the attachment part due to wedge effects. Therefore, where the cutting head and the holder are made of the cemented carbide small in coefficient of friction, it is possible to produce a sufficient frictional force capable of coping with high-load cutting.

On the other hand, after the male thread part is screwed with the female thread part to a certain amount and the attachment part is taper-fitted into the fitting part and when the leading end face of the holder is in contact with the rear end face of the cutting part, the attachment part will not be drawn inside any further than the extent. Thus, when the cutting head is replaced or when a cutting resistance is generated in a direction at which the male thread part is screwed with the female thread part, no excessive fastening will occur. It is, thus, possible to avoid any excessive stress acting on the holder. Further, when heating resulting from cutting raises temperatures of the cutting head and the holder and where the holder is greater in coefficient of thermal expansion than the cutting head, the holder will expand to a greater extent to decrease holding power by being taper-fitted. However, as described above, no excessive fastening will occur by the male thread part and the female thread part due to the cutting resistance. Thus, no situation will occur such that the cutting head is excessively taper-fitted into the holder due to the excessive fastening and cannot be removed when cooled after completion of cutting.

Further, the leading end face of the holder is in contact with the rear end face of the cutting part, by which cutting torque and moment can be received by the leading end face and the rear end face to improve rigidity and strength of the cutting head on attachment. It is also possible to transmit heat developed at the cutting head to the holder side between the leading end faces and also to suppress a rise in temperature of the cutting part. Still further, the cutting head is attached stably to a site in the direction of the central axis. Thus, if the length from the rear end face of the cutting part to a top edge of the cutting head could be managed in manufacturing the cutting head, the cutting part can be positioned accurately with respect to a machine tool by replacing only the cutting head with new one even though the holder is kept on the machine tool.

Moreover, the inner diameter to outer diameter ratio $d/D1$ which is a ratio of the inner diameter $d$ of the fitting part at the opening part of the attachment hole side of the holder in a state before the attachment part is fitted into the fitting part in relation to the outer diameter $D1$ of the leading end part of the holder on which the attachment hole has been formed is in a range of 0.5 to 0.8. The outer diameter expansion percentage $(D2-D1)/D1 \times 100$ (%) which indicates expansion of the outer diameter of the leading end part of the holder before and after being fitted is in a range of $0.022 \times d/D1 - 0.003$ (%) to $0.33 \times d/D1 - 0.06$ (%) with respect to the inner diameter to outer diameter ratio $d/D1$. Therefore, it is possible to impart a necessary thickness to the leading end part of the holder and also to prevent breakage of the holder while the above-described contact pressure is reliably retained and deformation before and after being fitted is also sufficiently suppressed to a range at which the contact pressure is obtained. Further, it is difficult to measure stress itself in a state of being fitted, and in order to measure an interference, it is also difficult to measure the inner diameter of the fitting part with high accuracy. In contrast, in the present invention, the outer diameter expansion percentage is set to be in the above-described range based on the outer diameter $D2$ of the leading end part of the holder which can be measured highly accurately even in a state of being fitted. Therefore, it is possible to obtain a desired contact pressure more reliably.

That is, where the inner diameter to outer diameter ratio $d/D1$ which is a ratio of the inner diameter $d$ of the fitting part at the opening part of the attachment hole side of the holder in a state before being fitted in relation to the outer diameter $D1$ of the leading end part of the holder also in a state before being fitted is large enough to be over 0.8, it is impossible to secure sufficient thickness between the outer circumferential face of the leading end part of the holder and the inner circumferential face of the attachment hole. Further, the leading end part of the holder decreases in thickness and easily increases in diameter which results in a decrease in contact pressure. Thus, the leading end part may be unable to withstand cutting torque acting on high-load cutting.

On the other hand, where the inner diameter to outer diameter ratio $d/D1$, is small enough to be less than 0.5, the leading end part of the holder increases in thickness and also in strength. And the contact pressure increases as the diameter becomes difficult to expand. However the contact diameter of the fitting part and the attachment part decreases. Therefore, it may be impossible to hold the cutting head against the cutting torque on high-load cutting.

Further, where the outer diameter expansion percentage $(D2-D1)/D1 \times 100$ (%) of the leading end part of the holder before and after being fitted with respect to the inner diameter to outer diameter ratio $d/D1$ is large enough to be over $0.33 \times d/D1 - 0.06$ (%), the leading end part of the holder increases in diameter in excess of tensile strength of the cemented carbide which forms the holder, and an excessive tensile stress is applied. Moreover, the leading end part of the holder may be broken. On the other hand, where the outer diameter expansion percentage $(D2-D1)/D1 \times 100$ (%) is small enough to be lower than $0.02 \times d/D1 - 0.003$ (%) with respect to the inner diameter to outer diameter ratio $d/D1$, no sufficient contact pressure will occur between the fitting part and the attachment part. Thus, the cutting head may be held unstably.

Still further, the cemented carbide which forms at least the leading end face and the fitting part of the holder is WC—Co based the cemented carbide having a relatively rough average particle size of WC, that is, 1 μm to 5 μm, and a binder phase quantity of Co which is a major component is set in a range of 8 wt % to 20 wt %. Thereby, it is possible to prevent the holder from breaking by an unexpected impact while cutting a workpiece. Also, an improvement of a coefficient of thermal conductivity can lead to quickly release cutting heat while cutting the workpiece.

That is, the cemented carbide of ultrafine particles which is 1 μm or less in average particle size of WC and used in forming an ordinary solid end mill which is integrated from a cutting part to a shank part is high in hardness but low in fracture toughness. Therefore, in particular upon action of the impact load while cutting the workpiece, for example, breakage may occur starting from grains or minute chipping resulting from grinding which will occur unavoidably in manufacturing the holder. However, where the cemented carbide is 5 μm or more in average particle size of WC, fracture toughness is improved but hardness becomes low. Thus, the fitting part may decrease in durability to result in unstable attachment of the cutting head earlier.

Further, in the above-described WC—Co based the cemented carbide having an average particle size of WC from 1 μm to 5 μm, where a binder phase quantity of Co which is a major component is 8 wt % or more, the tensile strength is about 1.5 GPa or more. Thus, it is possible to reliably impart sufficient rigidity and strength to the holder even on heavy cutting. Breaking ductility will be improved but Youngs' modulus will be decreased with an increase in the binder phase quantity. Therefore, the quantity is set to be 20 wt % or less.

On occurrence of lopsided contact with the outer circumferential face of the attachment part of the cutting head, the inner circumferential face of the attachment hole at the fitting part of the holder is unable to secure a great contact pressure by wedge effects as described above. There is also the cutting head may not be accurately disposed coaxially with the central axis of the attachment hole of the holder. Therefore, it is preferable that the inner circumferential face of the attachment hole has relatively smooth surface roughness, that is, a maximum height roughness Rz stipulated by JIS B 0601:2001 (ISO 42887: 1997) is 3.2 μm or less.

On the other hand, in order to prevent the above-described excessive fastening caused by further screwing the female thread part with the male thread part after the peripheral border of the opening part of the attachment hole on the leading end face of the holder is in contact with the rear end face of the cutting part of the cutting head, it is preferable that the peripheral border is made higher in maximum height roughness Rz than the inner circumferential face of the attachment hole, thereby increasing a coefficient of friction to cause a great friction resistance when the female thread part is screwed with the male thread part after being in contact therewith.

However, where the peripheral border of the opening part of the attachment hole is excessively great in surface roughness, the peripheral border is lopsidedly in contact with the rear end face of the cutting part of the cutting head, which may impair stable holding. Thus, it is preferable that the maximum height roughness Rz is 6.3 μm or less.

Further, the attachment part of the cutting head is made hollow, and a member made of a metal material lower in hardness than the cemented carbide which forms the attachment part of the cutting head is housed therein. Thereby, the attachment part of the cutting head is taper-fitted into the fitting part of the attachment hole of the holder. As a result, the leading end part of the holder increases in diameter, and the attachment part is pressed from the outer circumference in a radial direction to decrease both in inner diameter and outer diameter. Accordingly, the member is also pressed from the outer circumference in the radial direction and the member presses at the same time the attachment part from the inner circumference by its reaction force. That is, the attachment part is pressed from the inner circumference and the outer circumference and firmly clamped into the attachment hole by receiving pushing pressure force. Therefore, the outer diameter expansion percentage of the leading end part of the holder, $(D2-D1)/D1$ (%), is decreased as described above, thus making it possible to suppress the tensile stress and also to reliably hold the cutting head.

As described above, where the member lower in hardness than the cemented carbide is housed inside the attachment part of the cutting head, of the female thread part and the male thread part, the thread part of the cutting head is formed on the member. Unlike a case where the thread part is directly formed on the attachment part of the cutting head made of the cemented carbide that is a fragile material, it is possible to prevent breakage of the screw thread. The necessity of giving, for example, a special shape to the screw thread in view of preventing the breakage thereof, is eliminated which also contributes to a reduction in costs. This is also true for the thread part of the holder. That is, the member lower in hardness than the cemented carbide is housed in a deeper site side of the hole than the fitting part of the attachment hole, for example, to form the thread part of the holder which is screwed with the head-side screw part. Moreover, it is possible to reduce costs and also to prevent breakage of the screw thread.

On the other hand, it is preferable that each of the fitting part and the attachment part is formed in a tapered shape, with a taper rate being less than 1/10, assuming what is called a self-holding tapered shape. That is, for example, when cutting is carried out by using the end mill disclosed in Patent Document 1, the cutting edge having a great twisted angle may cause such a case that the cutting head is pulled in the direction of the central axis. In a self-releasing tapered shape which is tapered at a great inclination, a tapering contact pressure will also produce a force in a direction at which the cutting head is pushed out from the fitting part formed in a tapered shape. Therefore, a resultant force made up of a cutting force and a tapering force is applied to the female thread part and the male thread part. In order to hold the cutting head against the resultant force, the male thread part must be tightly fitted to the female thread part. As a result, an excessive stress is applied to the leading end part of the holder which is made of the cemented carbide.

However, in the above-described self-holding tapered shape which is tapered at a small inclination, in contrast to the above case, a resultant force made up of a tapering force and a fastening force by the female thread part of the holder and the male thread part of the cutting head is used against the cutting force. Therefore, it is possible to hold the cutting head reliably without greatly increasing the fastening force itself. It is, thus, possible to reliably decrease tensile stress acting on the leading end part of the holder and also to more effectively prevent any breakage.

Effects of the Invention

As described so far, according to the present invention, even where the cutting head is fitted into the holder and at least the thus fitted parts are made of the cemented carbide, any breakage resulting from action of an unnecessarily great tensile stress on the leading end part of the holder can be prevented to secure high rigidity and strength on attachment, while the cutting head is reliably held on high-load cutting. Thus, it is possible to carry out stable and highly efficient cutting with high accuracy.

MODE FOR CARRYING OUT THE INVENTION

Figure 1:
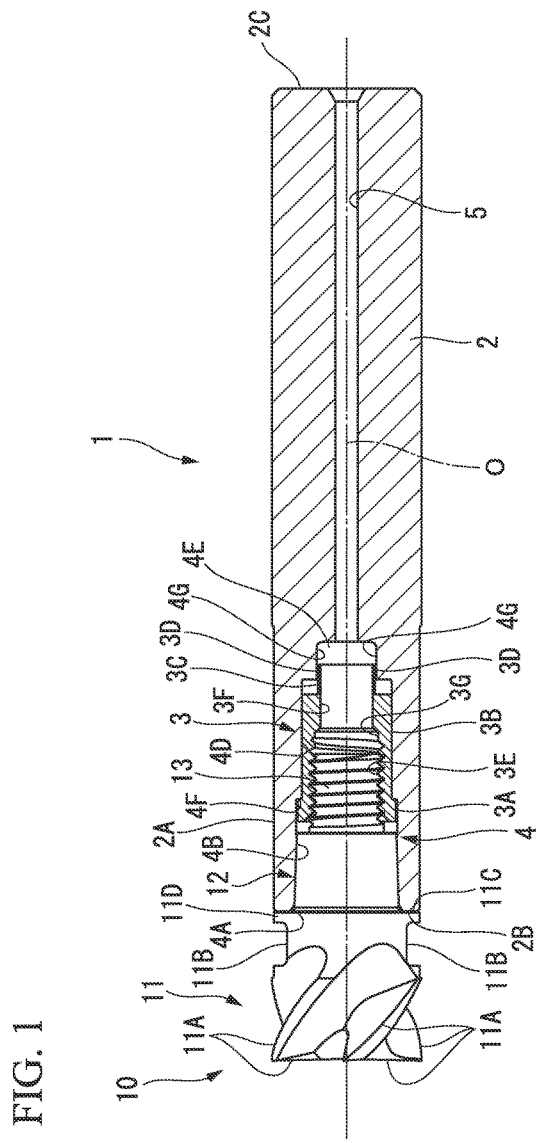
FIG. 1 is a side sectional view which shows one embodiment of a head replacement-type cutting tool of the present invention.
Figure 2:
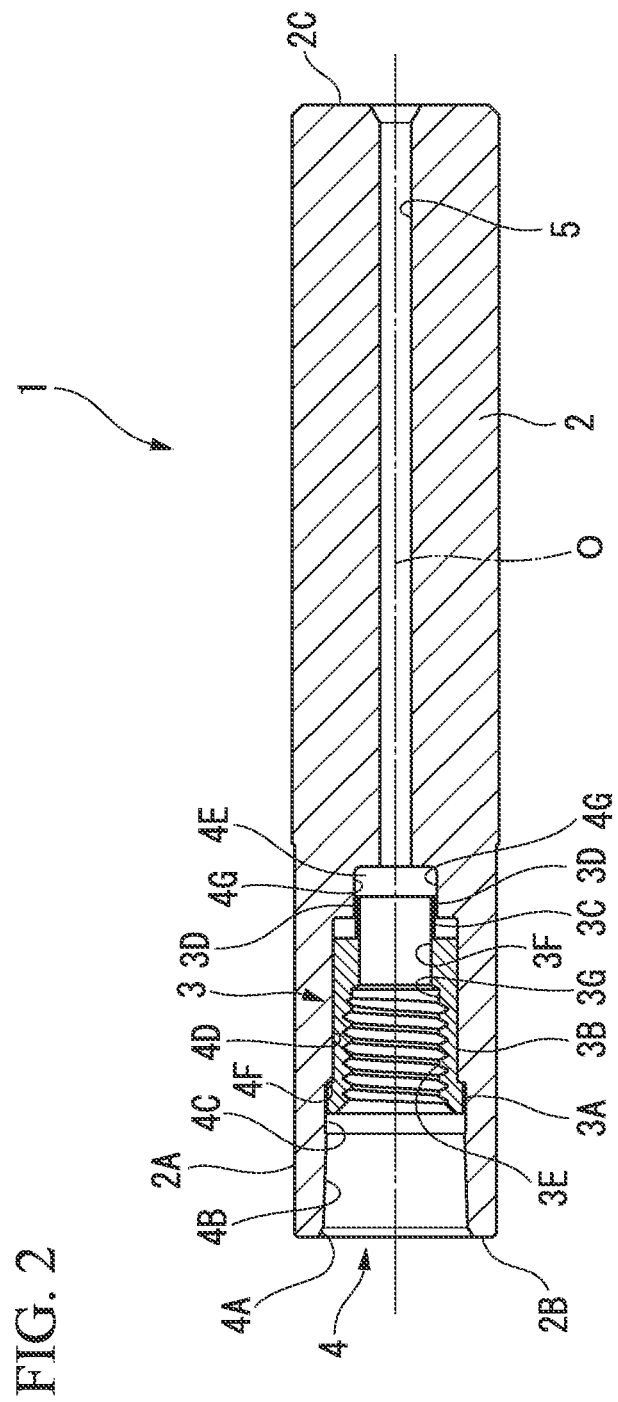
FIG. 2 is a side sectional view which shows a holder of the embodiment shown in FIG. 1.
Figure 3:
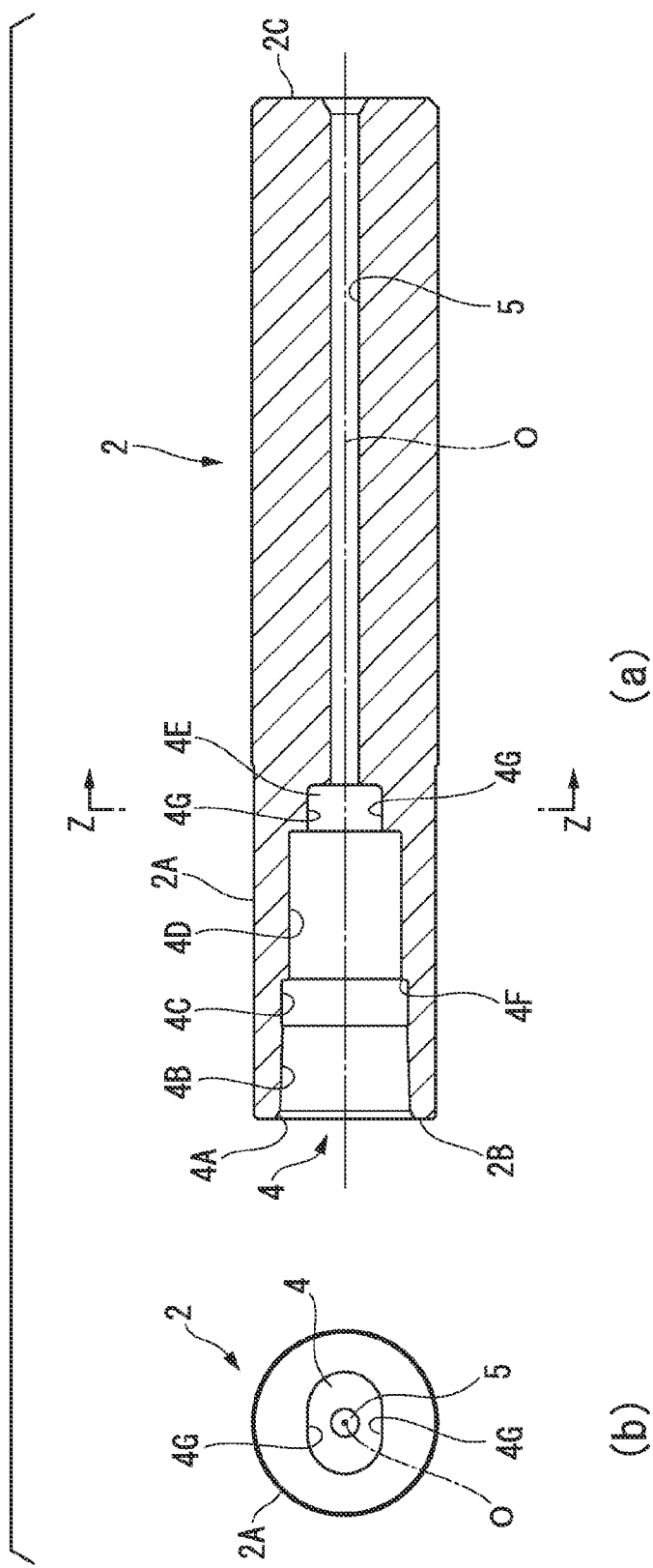
FIG. 3(a) is a side sectional view which shows a holder main body of the holder shown in FIG. 2.
FIG. 3(b) is a sectional view taken along line of Z to Z in FIG. 3(a).
Figure 4:
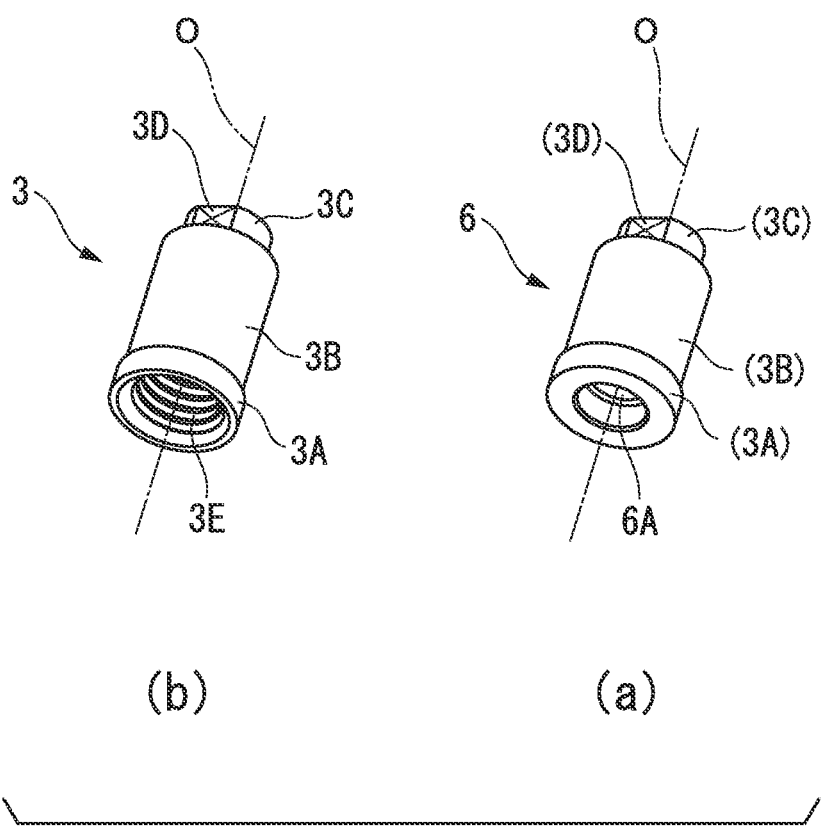
FIG. 4(a) is a drawing which shows a coupling member of the embodiment shown in FIG. 1, that is, a perspective view of a blank before plastic deformation.
FIG. 4(b) is a perspective view which shows the coupling member after the blank of FIG. 4(a) is allowed to undergo plastic deformation to form an attachment screw part (that is, a drawing which shows the coupling member itself which is integrated by being housed into an attachment hole of the holder).
Figure 5:
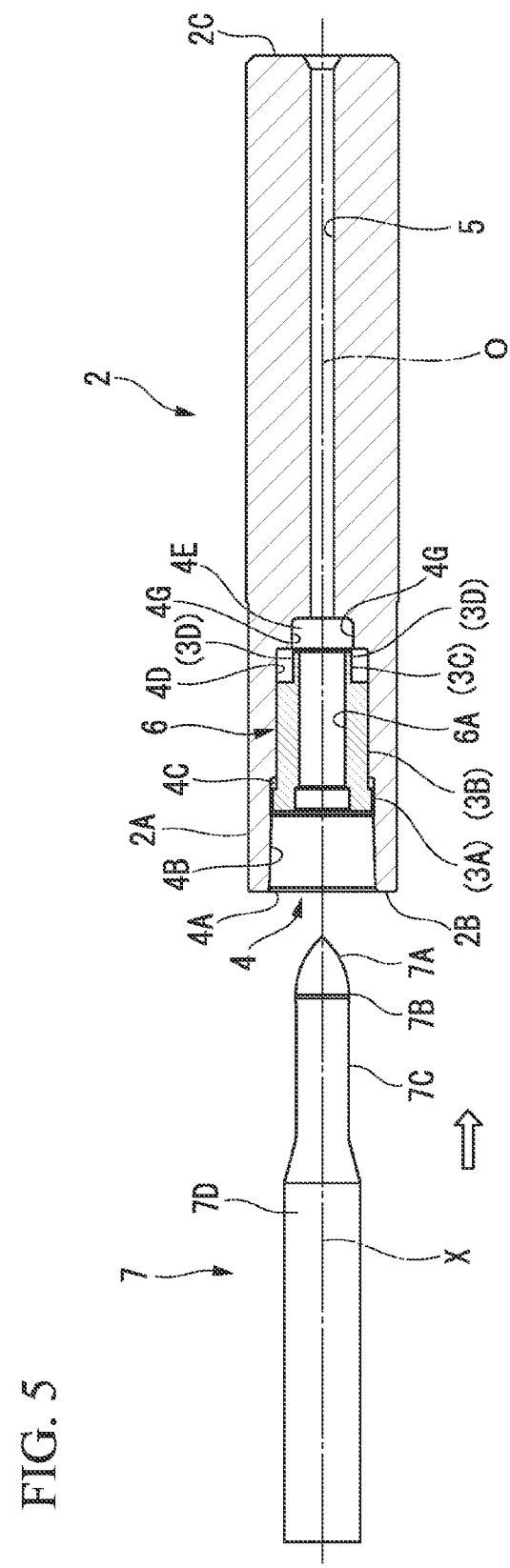
FIG. 5 is a drawing which describes a case where the coupling member is allowed to undergo plastic deformation in the embodiment shown in FIG. 1.

FIG. 1 is to show one embodiment of the head replacement-type cutting tool of the present invention. FIG. 2 is to show a holder 1 of the head replacement-type cutting tool of the embodiment. FIG. 3 to FIG. 5 is to explain steps of manufacturing the holder 1. The head replacement-type cutting tool of the present embodiment is such that the present invention is applied to a head replacement-type end mill.

The holder 1 of the head replacement-type cutting tool of the present embodiment is constituted with a holder main body 2 and a coupling member 3. The holder main body 2 is made of the cemented carbide. In particular, in the present embodiment, it is made of the cemented carbide, or WC—Co based cemented carbide having an average particle size of WC from 1 μm to 5 μm in which a binder phase quantity of Co as a major component is from 8 wt % to 20 wt %. On the other hand, the coupling member 3 is made of a steel material such as stainless steel or dies steel which is lower in hardness but higher in ductility than the cemented carbide which forms the holder main body 2.

The holder main body 2 has an appearance which is formed substantially in a columnar shape at the center of the central axis O. However, a part of the leading end thereof (on the left side in FIG. 1, FIG. 2, FIG. 3(a) and FIG. 5) is as a neck part 2A which is formed to assume a cylindrical face and slightly even smaller in outer diameter than a shank part of the rear end thereof (on the right side in FIG. 1, FIG. 2, FIG. 3(a) and FIG. 5). The outer diameter of the neck part 2A is the outer diameter of the leading end part of the holder 1. Further, on a leading end face 2B of the holder main body 2, there is formed an attachment hole 4 at the center of the central axis O so as to be recessed to the rear end. A through hole 5 smaller in diameter than the attachment hole 4 is formed along the central axis O so as to be communicatively connected from a rear end face 2C of the holder main body 2 to a bottom of the attachment hole 4.

A chamfered part 4A, a fitting part 413, a flank part 4C, an engaging part 4D and a recessed site 4E are formed in the attachment hole 4 sequentially from the leading end to the rear end. The chamfered part 4A is formed at a ridge line part intersecting with the leading end face 2B, and the fitting part 4B extends from the chamfered part 4A to the rear end side. The flank part 4C is made only slightly larger in inner diameter than the fitting part 4B at the rear end, and the engaging part 4D is made even smaller in inner diameter than the flank part 4C and the fitting part 4B at the rear end side. The recessed site 4E has a cross section orthogonal to the central axis O and the cross section is made smaller than the engaging part 4D. The through hole 5 is opened on a bottom which faces the leading end of the recessed site 4E.

Here, the chamfered part 4A, the fitting part 4B, the flank part 4C, the engaging part 4D and the through hole 5 excluding the recessed site 4E in the attachment hole 4 are such that each of the cross sections orthogonal to the central axis O is formed in a circular shape at the center of the central axis O. Of these parts, each of the flank part 4C, the engaging part 4D and the through hole 5 is provided with an inner circumferential face formed in the shape of a cylindrical face which is constant in inner diameter along a direction of the central axis O. Therefore, between the flank part 4C and the engaging part 4D, there is formed an annular wall part 4F which faces the leading end around an opening part of the engaging part 4D.

On the other hand, in the present embodiment, each of the chamfer part 4A and the fitting part 4B is formed in a tapered shape, the inner circumferential face of which is to give a recessed cone face which gradually increases in inner diameter at the center of the central axis O with movement to the opening part side of the attachment hole 4. Here, the fitting part 4B formed in a tapered shape is lower in taper rate than the chamfer part 4A, which is 1/10 or lower in the present embodiment. An inclination angle with respect to the central axis O on a cross section of the inner circumferential face of the fitting part 4B along the central axis O is a certain angle which is about 3° or lower. It is preferable that the inclination angle is in a range of 1° to 3°. More specifically, in the present embodiment, the taper rate is 1/14 and the above-described inclination angle is 2°. Therefore, the leading end part of the holder 1 is formed in a cylindrical shape. However, since the fitting part 4B is formed in a tapered shape, the leading end part thereof is not formed in the shape of a cylinder in a strict sense. That is also true for the outer circumferential face of the leading end part of the holder 1. That is, it is acceptable that the neck part 2A is formed to give a tapered neck part which gradually decreases in diameter with movement to the leading end.

On the other hand, a recessed part is formed on the inner circumferential face of the engaging part 4D in the attachment hole 4. It is acceptable that the recessed part is such that after the holder main body 2 made of the above-described sintered material has been sintered and formed, an annular groove around the central axis O, a straight line groove along the direction of the central axis O, a spiral groove, a studded dent are formed by machining or the like, thereby forming at least one of a wall part which faces the bottom of the attachment hole 4 and a wall part which faces in a circumferential direction around the central axis O. In the present embodiment, as described above, conditions, for example, for powder-compacting and sintering the holder main body 2 are adjusted, by which the surface roughness of the inner circumferential face of the engaging part 4D is as an irregular surface in which a maximum height roughness Rz stipulated by JIS B 0601: 2001 (ISO 42887: 1997) is 5 μm to 200 μm, and the irregular surface is as the above-described recessed part.

That is, the holder main body 2 made of the above-described sintered material is manufactured by procedures in which raw-material powders such as, for example, WC and Co, are compacted by using a pressing mold to form a compressed powder body and the compressed powder body is heated, sintered and subjected to finishing work such as polishing, whenever necessary. Here, on molding the compressed powder body, the inner circumferential face of the engaging part 4D is processed so as to obtain the above-described surface roughness after sintering, a heating temperature and time on sintering are adjusted, and polishing is performed after sintering to adjust the surface roughness. Alternatively, the inner circumferential face of the engaging part 4D is not polished but is kept in a sintered state as is. Thereby, the above-described surface roughness can be imparted to the inner circumferential face of the engaging part 4D.

As a matter of course, it is acceptable that one of the above-described means is used to adjust the surface roughness of the inner circumferential face of the engaging part 4D or two or more means are combined appropriately to adjust the surface roughness. It is also acceptable that the inner circumferential face of the engaging part 4D is adjusted for its surface roughness to form a groove and a recess as described above. Further, for example, where a straight line groove is formed along the direction of the central axis O, the groove may be formed by using a pressing mold when compressed powder body is molded.

In contrast, the inner circumferential face of the fitting part 4B is made smoother in surface roughness than the engaging part 4D and processed so that a maximum height roughness Rz is 3.2 μm or lower also as stipulated by JIS B 0601: 2001 (ISO 42887: 1997). The surface roughness of the fitting part 4B is obtained by, for example, further polishing, which is different from a case where the above-described means is employed to adjust the surface roughness of the engaging part 4D.

Further, the surface roughness of the leading end face 2B of the holder main body 2 at which the attachment hole 4 is opened is adjusted for its maximum height roughness Rz so as to be 6.3 μm or lower but higher in surface roughness than the inner circumferential face of the fitting part 4B. It is noted that the maximum height roughness Rz of each of them is a result obtained under evaluation conditions of reference length: 0.8 mm, cut off value λs=0.0025 mm, and λc=0.8 mm. Further, the leading end face 2B is formed in the shape of an annular flat face which is perpendicular to the central axis O of the holder main body 2, that is, to the central axis O of the attachment hole 4.

On the other hand, the recessed site 4E which is positioned at the deepest part of the attachment hole 4 has a cross section orthogonal to the central axis O and, in the present embodiment, as shown in FIG. 3(b), the cross section is formed in an ellipse shape having a long axis in a diametric direction with respect to the central axis O. Moreover, the recessed site 4E is formed so as to extend in the direction of the central axis O, with the ellipse shaped-cross section being kept constant. Therefore, wall faces 4G are formed on the both sides at the long axis of the cross section orthogonal to the central axis O, are formed so as to extend parallel with the central axis O and also parallel with each other.

It is noted that as for the length of each part of the attachment hole 4 in the direction of the central axis O, in the present embodiment, the engaging part 4D is the longest, followed by the fitting part 4B. After that, the recessed site 4E is longer than and followed by the flank part 4C, and the chamfered part 4A is the shortest. It is, however, acceptable that no chamfered part 4A is formed.

The coupling member 3 is housed into the attachment hole 4 of the thus constituted holder main body 2. As shown in FIG. 4(b), the coupling member 3 has an appearance which is formed at the center of the central axis O substantially in a cylindrical shape with a plurality of steps. Moreover, sequentially from the leading end (on the lower side in FIG. 4) to the rear end (on the upper side in FIG. 4), a collar part 3A which is housed in the flank part 4C of the attachment hole 4, an engaged part 3B which is housed in the engaging part 4D and a detent part 3C which is housed in the recessed site 4E are integrated so as to be decreased in outer diameter in a stepwise manner.

Of these parts, the collar part 3A has an outer diameter which is larger than an inner diameter of the engaging part 4D of the attachment hole 4 and slightly smaller than an inner diameter of the flank part 4C and an inner diameter of the fitting part 4B at the rear end. Also, the collar part 3A is made slightly shorter in length than the flank part 4C in the direction of the central axis O and allowed to be in contact with the wall part 4F of the attachment hole 4 from the leading end in an attachment state that the coupling member 3 is attached to the holder main body 2. Further, the detent part 3C is such that a cross section orthogonal to the central axis O is formed in the shape of an ellipse in such a shape and dimensions that allow engagement with the recessed site 4E of the attachment hole 4. Therefore, on both sides behind the long axis of the ellipse, a pair of side faces 3D, each of which is formed in the shape of a straight line on a cross section orthogonal to the central axis O, are formed so as to extend parallel with the central axis O and also parallel with each other. In the above-described attachment state, the side faces 3D are opposed to the wall faces 4G of the recessed site 4E via small gap.

Further, the inner circumferential part of the coupling member 3 is allowed to penetrate through along the central axis O. Moreover, a female thread part 3E is formed at the leading end thereof and is as an attachment screw part in the present embodiment. The female thread part 3E has an inner diameter which is larger than a through hole part 3F penetrating through the detent part 3C at the rear end of the inner circumferential part of the coupling member 3. In the above-described attachment state, the female thread part 3E extends from the leading end side of the coupling member 3 to the leading end further than the rear end of the engaged part 3B, for example, to a part exceeding ½ of the length of the engaging part 4D in the direction of the central axis O. It is noted that the length of the engaged part 3B in the direction of the central axis O is made slightly shorter than the length of the engaging part 4D in the direction of the central axis O. In the above-described attachment state, the detent part 3C protruding at the rear end of the engaged part 3B is housed at the recessed site 4E, passing through the engaging part 4D.

Further, in the above-described attachment state, the engaged part 3B is engaged in such a manner that the outer circumferential face thereof is firmly attached to the inner circumferential face of the engaging part 4D and fitted into the recessed part. In other words, in the present embodiment where the recessed part is as an irregular surface having the above-described surface roughness, the outer circumferential face of the engaged part 3B is as an irregular face along a contour of the irregular surface and firmly attached on the inner circumferential face of the engaging part 4D and engaged with the recessed part. It is, however, acceptable that the outer circumferential face of the engaged part 3B is not entirely firmly attached on the recessed part in such a manner that the irregular surface formed by the inner circumferential face of the engaging part 4D is reversed as is. As long as the coupling member 3 is reliably attached with strength, it is acceptable that the outer circumferential face thereof is fitted in the midstream of the depth of the recessed part and engaged therewith.

As described above, in order that the outer circumferential face of the engaged part 3B of the coupling member 3 is firmly attached on the inner circumferential face of the engaging part 4D of the attachment hole 4 and engaged with the recessed part, a multiple-step cylindrical blank 6 of the coupling member 3 as shown in FIG. 4(a) in which the outer diameter of the engaged part 3B is made slightly smaller than the inner diameter of the engaging part 4D is formed with the above-described stainless steel, for example, and housed into the attachment hole 4, as shown in FIG. 5. Moreover, the press-fit member (punch) 7 which has an outer diameter slightly larger than the inner diameter of the blank 6 is press-fitted into the inner circumferential part of the blank 6 and allowed to undergo plastic deformation so as to increase the diameter of the blank 6. Thereby, it is acceptable that the outer circumferential face of the engaged part 3B is pressed to the inner circumferential face of the engaging part 4D and fitted into the recessed part (irregular surface).

Here, the blank 6 is made substantially equal in length in the direction of the central axis O to each of the parts of the coupling member 3 shown in parentheses in FIG. 4(a) and FIG. 5. Further, the collar part 3A is equal in outer diameter, cross-sectional shape and dimensions to the detent part 3C. However, the female thread part 3E is not formed in the inner circumferential part of the blank 6 and is as a shouldered hole in which a part positioned at the collar part 3A at the leading end of the inner circumferential part in the direction of the central axis O is made slightly larger in diameter than a press-fit hole part 6A penetrating through the detent part 3C. The press-fit hole part 6A is constant in inner diameter and is slightly smaller than the inner diameter of the through hole part 3F of the coupling member 3 by, for example, about 0.2 mm to 1.0 mm in a state where the engaged part 3B is allowed to undergo plastic deformation and engaged with the engaging part 4D. It is noted that the outer diameter of the engaged part 3B of the blank 6 is made smaller than the inner diameter of the engaging part 4D of the attachment hole 4 by, for example, 0.1 mm to 0.5 mm.

Further, a press-fit member 7 is made of a material higher in hardness than the above-described stainless steel, which forms the coupling member 3 and the blank 6. Moreover, the press-fit member 7 is formed in the shape of a shaft so that a cross section orthogonal to a press-fit axis X disposed coaxially with the central axis O is formed in a circular shape. A point part 7A of the press-fit member 7 which is press-fitted to the blank 6 (on the right side in FIG. 5) is formed in a bullet shape. The press-fit member 7 is provided with a large diameter part 7B at the rear end of the point part 7A and formed so as to extend to a base end part 7D which is attached to a press-fit device (not illustrated) via a tapered part 7C which slightly decreases in outer diameter with movement from the large diameter part 7B to the base end side of the press-fit member 7 (on the left side in FIG. 5). It is noted that a difference in outer diameter between the large diameter part 7B and a diameter-decreasing part at the rear end of the tapered part 7C is, for example, in a range of 20 μm to 200 μm.

Moreover, the outer diameter of the large diameter part 7B is made larger than the inner diameter of the press-fit hole part 6A of the blank 6. Here, a difference between the outer diameter of the large diameter part 713 and the inner diameter of the press-fit hole part 6A is larger than a value at which the blank 6 exceeds a range of elastic deformation and undergoes plastic deformation when the press-fit member 7 is press-fitted into the press-fit hole part 6A. However, where the difference is excessively large, the blank 6 may increase in diameter unnecessarily to cause breakage of the holder main body 2. Therefore, an upper limit of the difference is set, with the above-described situation taken into account. Thus, the upper limit is a value substantially equal to a difference in inner diameter between the press-fit hole part 6A and the through hole part 3F in, for example, a range of 0.2 mm to 1.0 mm.

Therefore, as shown in FIG. 5, the blank 6 is housed into the attachment hole 4 to fix the holder main body 2. Moreover, as described above, the press-fit axis X of the press-fit member 7 is disposed coaxially with the central axis O and the press-fit device is used to insert the press-fit member 7 into the inner circumferential part of the blank 6, as shown with an arrow given in FIG. 5. Then, the point part 7A of the press-fit member 7 is at first brought into contact with the opening part of the press-fit hole part 6A, by which the blank 6 is pressed into the rear end side of the holder main body 2. The collar part 3A is brought into contact with the wall part 4F of the attachment hole 4 and the detent part 3C is housed into the recessed site 4E. At this time, the blank 6 is restrained from moving in the direction of the central axis O.

Moreover, the press-fit member 7 is allowed to move further forward and press-fitted into the press-fit hole part 6A, and the engaged part 3B of the blank 6 then undergoes plastic deformation so that the engaged part 3B of the blank 6 increases in diameter by the large diameter part 7B. Thereby, the outer circumferential face of the engaged part 3B is firmly attached on the inner circumferential face of the engaging part 4D and pressed so as to be fitted into the recessed part and engaged with the recessed part. Moreover, for example, when the large diameter part 713 reaches the rear end of the engaged part 3B, the press-fit member 7 is allowed to move backward and pulled out from the press-fit hole part 6A. Moreover, the blank 6 is attached into the attachment hole 4 and firmly integrated with the holder main body 2, and the press-fit hole part 6A is allowed to increase in diameter, thereby forming the through hole part 3F. Thereafter, a screw pilot hole 3G and a female thread part 3E, each of which has a predetermined inner diameter at the center of the central axis O, are formed at the leading end of the through hole part 3F, thus making it possible to obtain the thus constituted holder for a head replacement-type cutting tool 1. Where there is no fear that the press-fit member 7 may interfere with the holder main body 2, it is acceptable that the large diameter part 7B is press-fitted until being pulled out from the rear end of the press-fit hole part 6A.

The thus constituted holder for head replacement-type cutting tool 1 is constituted as the head replacement-type cutting tool of the present embodiment by attaching a replacement-type cutting head 10 to the leading end part thereof in a coupling manner, as shown in FIG. 1, and used in cutting a workpiece by attaching the shank part at the rear end of the holder main body 2 to a machine tool. The replacement-type cutting head 10 is provided at the leading end part with a cutting part 11. An attachment part 12 which is attached to the attachment hole 4 of the holder main body 2 is formed at the rear end side of the cutting part 11. The male thread part 13 as a head-side screw part which is screwed into the female thread part 3E, that is, an attachment screw part of the coupling member 3, is installed at a further rear end side thereof so as to be positioned at the center of the central axis O.

Here, in the head replacement-type cutting tool of the present embodiment which is used as a head replacement-type end mill, a plurality of cutting edges 11A are formed at the leading end of the cutting part 11 so as to be positioned at the center of the central axis O of the holder main body 2. In particular, a cutting edge 11A formed on the outer circumference side of the cutting part 11 is formed so as to be twisted backward in a direction at which the head replacement-type cutting tool rotates while cutting the workpiece to be described later, with movement from the leading end to the rear end. Further, on the outer circumference of the cutting part 11 at the rear end, there is formed a turning part 11B with which a hand tool such as a wrench is engaged and turned when the replacement-type cutting head 10 is attached in a detachable manner. The turning part 11B is at least as a pair of parallel faces which are parallel with the central axis O and also parallel with each other and formed so as to notch the rear end of the cylindrical cutting part 11.

Further, the turning part 11B is formed, with an interval kept from a rear end face 11C of the cutting part 11. Thereby, between the turning part 11B and the rear end face 11C, there is formed a flange part 11D which protrudes outside in a radial direction at the center of the central axis O. It is noted that the rear end face 11C is made substantially equal in outer diameter to the leading end face 2B of the holder main body 2 and is as an annular flat face so as to be perpendicular to the central axis O.

Still further, the attachment part 12 is attached by being fitted into the fitting part 4B of the attachment hole 4. The fitting part 413 is formed in a tapered shape so that the inner circumferential face thereof gradually increases in inner diameter with movement to the opening part of the attachment hole 4. The attachment part 12 is also formed at the center of the central axis O in a circular truncated cone-like tapered shape which gradually increases in outer diameter so as to give a taper rate (inclination angle) which is equal to that of the fitting part 4B and also to give an outer diameter which is slightly larger than the inner diameter of the fitting part 4B, with movement to the base end of the attachment part 12 (at the leading end side of the cutting head 10 of the replacement-type and on the left side in FIG. 1).

Moreover, the attachment part 12 and the rear end face 11C of the cutting part 11 are made of the cemented carbide, as with the holder main body 2 of the holder 1. In particular, in the present embodiment, the cutting part 11 in its entirety is formed with the attachment part 12 in an integrated manner by using cemented carbide. It is noted that the outer circumferential face of the attachment part 12 is adjusted for its surface roughness in such a manner that, as with the inner circumferential face of the fitting part 4B, the maximum height roughness Rs stipulated by JIS B 0601: 2001 (ISO 42887: 1997) is 3.2 µm or lower. The rear end face 11C of the cutting part 11 from which the attachment part 12 protrudes is adjusted so that, as with the leading end face 2B of the holder main body 2, a maximum height roughness Rz is 6.3 µm or lower but adjusted for its surface roughness so as to be greater than the outer circumferential face of the attachment part 12.

Further, it is acceptable that, as with the cemented carbide which forms the holder main body 2, cemented carbide which forms the cutting part 11 and the attachment part 12 of the cutting head 10 is WC—Co based cemented carbide in which an average particle size of WC is from 1 µm to 5 µm and a binder phase quantity of Co as a major component is 8 wt % to 20 wt %. However, it is acceptable that this cemented carbide is different from that which forms the holder main body 2. Moreover, it is possible to extend a tool life by using, for example, cemented carbide of ultrafine particles with an average particle size of WC smaller than 1 µm to improve the wear resistance of the cutting part 11.

On the other hand, it is acceptable that the male thread part 13 as a head-side screw part is made of the cemented carbide and formed integrally with the cutting part 11 and the attachment part 12. However, with consideration given to breakage of the screw thread and easy formation of the male thread part 13, as with the above-described coupling member 3, it is preferable that the male thread part 13 is made of a metal material which is lower in hardness than cemented carbide which forms the cutting part 11 and the attachment part 12, for example, a steel material such as stainless steel or dies steel higher in ductility than cemented carbide.

Therefore, as described above, the male thread part 13 made of a material different from that the cutting part 11 and the attachment part 12 is attached to the cutting part 11 and the attachment part 12 is similar to attachment of the coupling member 3 to the holder main body 2 in the above-described holder. That is, it is acceptable that, as described above, of the cutting part 11 and the attachment part 12 integrally formed by using cemented carbide, at least the attachment part 12 is made hollow to form a head-side attachment hole so as to have a recessed part on the inner circumferential face thereof, the external thread member as a head-side coupling member which is made of stainless steel and on which the male thread part 13 is formed is housed into the head-side attachment hole, and the outer circumferential face thereof is firmly attached to the inner circumferential face of the head-side attachment hole and engaged with the recessed part.

More specifically, in the present embodiment, the head-side attachment hole is formed at the cutting part 11 and the attachment part 12 so as to run along the central axis O. Moreover, on the inner circumferential face thereof, there is formed a recessed part composed of an irregular surface having a maximum height roughness Rz of 5 μm or more to 200 μm or less, and the recess part is provided with at least one of a wall part which faces a bottom of the head-side attachment hole side (at the leading end side of the cutting head 10) and a flat face-like wall part which faces in a circumferential direction around the central axis O, for example, extending in the direction of the central axis O. On the other hand, the external thread member is formed in a cylindrical shape having an inner circumferential part in which a part housed into the head-side attachment hole is smaller in inner diameter than a part at which the male thread part 13 is formed.

Moreover, a small inner-diameter part of the external thread member is housed into the head-side attachment hole to restrain the external thread member from moving in a direction to the bottom of the attachment hole. Moreover, in a similar manner as the press-fit member 7 is press-fitted to the blank 6 of the coupling member 3 of the holder 1, a press-fit member (punch) is press-fitted into the inner circumferential part thereof, allowing the external thread member to undergo plastic deformation. As a result, the outer circumferential face of the small inner-diameter part is firmly attached on the inner circumferential face of the head-side attachment hole and engaged so as to be fitted into the recessed part. Moreover, as described above, there is obtained a replacement-type cutting head 10 in which the cutting part 11 and the attachment part 12 are made of a hard material, while the male thread part 13 is made of a material lower in hardness.

As with the above-described holder 1, the small inner-diameter part of the external thread member before being press-fitted is smaller than the inner diameter of the same part by about 0.2 mm to 1.0 mm after being press-fitted and is also smaller than the outer diameter of a large diameter part of the press-fit member. Further, the outer diameter of the small inner-diameter part of the external thread member before being press-fitted is made smaller by, for example, about 0.1 mm to 0.5 mm than the inner diameter of a part at which the recessed part of the head-side attachment hole is formed. Still further, the difference in outer diameter between the large diameter part of the press-fit member and the small diameter part at the rear end thereof is, for example, about 20 μm to 200 μm. It is acceptable that the male thread part 13 is formed on an outer circumferential face of a part of the external thread member larger in inner diameter after being press-fitted. However, where the large diameter part is larger in inner diameter than the large diameter part of the press-fit member, the large diameter part will not undergo plastic deformation. Thus, it is acceptable that the male thread part 13 is formed in advance and then press-fitted.

The thus constituted replacement-type cutting head 10 is pressed into the holder 1 by screwing the male thread part 13 into the female thread part 3E. After the attachment part 12 is in contact with the fitting part 4B of the attachment hole 4 in a sliding manner, the turning part 11B is engaged with a hand tool and turned. Thereby, the attachment part 12 which is formed in a tapered shape is firmly attached to the fitting part 4B which is also formed in a tapered shape and pressed. Thereby, the neck part 2A at the leading end part of the holder main body 2 undergoes slight elastic deformation to increase in outer diameter and is further screwed. Moreover, the attachment part 12 is fitted into the fitting part 4B and the rear end face 11C of the cutting part 11 is in contact with the leading end face 2B of the holder main body 2 and firmly attached. At this time, the cutting head 10 is restrained in the direction of the central axis O and attached in a coupling manner.

Further, the thus constituted head replacement-type cutting tool of the present embodiment which is an end mill is such that, as described above, a shank part at the rear end of the holder main body 2 of the holder 1 is attached to a machine tool and fed in a direction intersecting with the central axis O, while rotating around the central axis O, cutting a workpiece by the cutting edge 11A of the cutting part 11 of the cutting head 10. Here, the male thread part 13 is screwed into the female thread part 3E in a direction opposed to a direction at which the head replacement-type cutting tool rotates while cutting the workpiece.

Moreover, as described above, the attachment part 12 is fitted into the fitting part 4B, and the rear end face 11C of the cutting part 11 is also in contact with the leading end face 2B of the holder main body 2, by which the cutting head 10 is restrained in the direction of the central axis O. Thereby, the outer diameter expansion percentage $(D2-D1)/D1\times100$ (%) formed with respect to the outer diameter D1 by D2−D1 which is the expansion quantity obtained by deducting the outer diameter D2 of the neck part 2A at the slightly increased leading end part of the holder 1 in a state that the cutting head 10 has been attached to the holder 1 from the outer diameter D1 of the neck part 2A in a state that the cutting head 10 before the attachment part 12 is fitted into the fitting part 4B is removed from the holder 1 is in a range from $0.022\times d/D1-0.003$ (%) to $0.33\times d/D1-0.06$ (%) with respect to the inner diameter to outer diameter ratio d/D1 of the leading end part of the holder 1 which is a ratio of the inner diameter d of the fitting part 4B at the opening part side of the attachment hole 4 before being fitted in relation to the outer diameter D1.

Further, the inner diameter to outer diameter ratio d/D1 itself between the inner diameter d of the fitting part 4B at the opening part side of the attachment hole 4 in a state before the attachment part 12 is fitted into the fitting part 4B and the outer diameter D1 of the neck part 2A at the leading end part of the holder 1 is in a range of 0.5 to 0.8. It is noted that, as described in the present embodiment, where the chamfer part 4A is formed at the opening part of the attachment hole 4, the inner diameter d of the fitting part 4B at the opening part side of the attachment hole 4 is as a diameter of a circle formed by a ridge line intersecting between the fitting part 4B and the leading end face 2B of the holder main body 2 on the assumption that no chamfer part 4A is formed. Further, each of the outer diameters D1, D2 before and after the attachment part 12 has been fitted is as an outer diameter of the leading end of the holder 1 and also is as an outer diameter obtained on the assumption that no chamfer is given, where the outer circumference of the leading end part of the holder 1 is chamfered. Still further, as described above, it is acceptable that the leading end part of the holder 1 is not necessarily formed in the shape of a cylinder in a strict sense. It is also acceptable that, for example, the neck part 2A is a tapered neck part, as described above. In this case, where the neck part 2A is chamfered, it is acceptable that a diameter of a circle formed by a ridge line intersecting between an extended face of the tapered neck part and the leading end face 2B is as the outer diameter D1 and the outer diameter D2. It is also acceptable that the outer circumferential face of the leading end part of the holder 1 is a polygonal shape in which a cross section thereof is formed so as to assume a shape close to a circle, for example, a regular dodecagon or more.

In the thus constituted head replacement-type cutting tool, as described above, the holder main body 2 of the holder 1 in which the shank part at the rear end is attached to a machine tool and the cutting head 10 which is attached to the leading end part of the holder 1 to perform cutting at the cutting part 11 are both made of the cemented carbide that is a hard material. They are attached by direct contact of the fitting part 4B and the leading end face 2B with the attachment part 12 and the rear end face 11C. Therefore, high strength and rigidity of the cutting tool can be secured. It is possible to prevent breakage and chattering vibration while cutting the workpiece and also to obtain accuracy and efficiency of machining.

Further, the inner circumference face of the fitting part 4B and the outer circumferential face of the attachment part 12 extending in the direction of the central axis O of the holder 1 and the front end face 2B and the rear end face 11C, each of which is a flat face extending in a direction perpendicular to the central axis O, are respectively in contact with each other, thereby holding the cutting head 10 by what is called a two-face restraint. That is, one of the inner circumferential face and the outer circumferential face as well as one of the front end face 2B and the rear end face 11C are restrained from moving in a direction at which they extend by the other of them. Cutting torque acting on the cutting head 10 and moment acting on the cutting head 10 can be received also by the front end face 2B and the rear end face 11C. Therefore, the cutting head 10 can be attached to the holder with high stiffness and high strength. Moreover, there is no chance that the cutting head 10 will incline with respect to the central axis O.

Further, each of the attachment part 12 of the cutting head 10 and the fitting part 4B of the holder 1 is formed in a tapered shape so as to be fitted with each other. The cutting head 10 is taper-fitted into the attachment hole 4 by screwing the female thread part 3E with the male thread part 13. At this time, the female thread part 3E is screwed with the male thread part 13, by which the attachment part 12 is drawn into the attachment hole 4. Thereby, the attachment part 12 expands the attachment hole 4 by wedge effects. The attachment part 12 is fastened by the attachment hole 4 due to a reaction force thereof. It is, thus, possible to secure a great contact pressure between the inner circumferential face of the fitting part 4B and the outer circumferential face of the attachment part 12. Therefore, even where the attachment part 12 and the fitting part 4B are both made of the cemented carbide smaller in coefficient of friction, it is possible to produce a sufficient frictional force and to reliably hold the cutting head 10 against a high load, if the high load occurs while cutting the workpiece.

On the other hand, each of the leading end face 2B of the holder 1 and the rear end face 11C of the cutting head 10 are as a flat face perpendicular to the central axis O. As described above, the female thread part 3E is screwed into the male thread part 13, by which the attachment part 12 is taper-fitted into the fitting part 4B. Thereafter, when the rear end face 2B is in contact with the rear end face 11C, the cutting head 10 is restrained in the direction of the central axis O, and the attachment part 12 will not be further drawn into the attachment hole 4. Therefore, when replacing the cutting head 10, the male thread part 13 is not screwed into the female thread part 3E to an excessive extent. Alternatively, when an excessive cutting resistance is generated in a direction at which the female thread part 3E is screwed with the male thread part 13, the male thread part 13 is not screwed into the female thread part 3E to an excessive extent. Thus, it is possible to prevent action of an excessive stress on the holder 1 resulting from the fact that wedge effects are applied excessively and the attachment part 12 expands the fitting part 4B too much.

Further, for example, as described above, when the holder main body 2 is made of the cemented carbide greater in average particle size of WC than cemented carbide of which the cutting head 10 is made and the holder main body 2 is greater in coefficient of thermal expansion than the cutting head 10, the temperature of the cutting head 10 and the holder main body 2 are increased by cutting heat, and then the holder main body 2 becomes larger than the cutting head 10 in expansion volume. Thereby, even where the fitting part 4B is in contact with the attachment part 12 at a lower contact pressure to result in a decrease in holding power by taper fitting, the leading end face 2B is in contact with the rear end face 11C to restrain the cutting head 10. Thereby, no excessive fastening will occur by further screwing the female thread part 3E with the male thread part 13. As a result, there is no chance that the cutting head 10 and the holder 1 are cooled after completion of cutting to cause the excessive fastening or excessively strong taper fitting disables removal of the cutting head 10.

Further, not only the inner circumferential face of the fitting part 4B and the outer circumferential face of the attachment part 12 but also the leading end face 2B of the holder main body 2 and the rear end face 11C of the cutting part 11 are in contact with each other. Thereby, the cutting head 10 is in contact with the holder 1 in an increased area. As described above, it is possible to smoothly transmit to the holder 1 heat generated at the cutting part 11 of the cutting head 10 while cutting workpiece and also to prevent a rise in temperature of the cutting part 11.

In particular, where the holder main body 2 is, as described in the present embodiment, made of the cemented carbide which is rougher than cemented carbide, of which the cutting part 11 of the cutting head 10 is made, for example, the coefficient of thermal conductivity of cemented carbide of ultrafine particles whose average particle size of WC is 1 μm or less is 71 W/m·° C., whereas the coefficient of thermal conductivity of rough cemented carbide whose average particle size of WC is from 1 μm to 5 μm is 91 W/m·° C. Moreover, the holder main body 2 is larger in size and greater in heat capacity than the cutting part 11, thus making it possible to suppress a rise in temperature of the cutting part 11 more effectively.

Moreover, in the thus constituted head replacement-type cutting tool, in the holder 1 in a state that the attachment part 12 is fitted into the fitting part 4B, the inner diameter to outer diameter ratio d/D1, which is a ratio of the inner diameter d of the fitting part 4B at the opening part side of the attachment hole 4 of the holder main body 2 in relation to the outer diameter D1 of the leading end part of the holder main body 2 is in a range of 0.5 to 0.8. In the present embodiment, the ratio is set to be 0.65. Moreover, the outer diameter expansion percentage (D2−D1)/D1×100 (%), which is a percentage expressed by the outer diameter increased quantity D2−D1, that is, the difference between the outer diameter D2 of the leading end part of the holder main body 2 after the attachment part 12 has been fitted into the fitting part 4B and the outer diameter D1 with respect to the outer diameter D1 is in a range of 0.022/D1−0.003 (%) to 0.33× d/D1−0.06 (%) with respect to the inner diameter to outer diameter ratio d/D1.

Here, in the holder 1 before being fitted, where the inner diameter to outer diameter ratio d/D1 which is a ratio of the inner diameter d of the fitting part 4B at the opening part of the attachment hole 4 of the holder main body 2 in relation to the outer diameter D1 of the leading end part of the holder main body 2 is over 0.8, the inner diameter d is too close to the outer diameter D1. Then, the thickness between the inner circumferential face and the outer circumferential face at the leading end part of the holder main body 2 is made too thin and the strength is also decreased. Further, since the leading end part of the holder main body 2 decreases in thickness, it easily increases in diameter to decrease contact pressure. Therefore, the cutting head 10 is unable to withstand cutting torque and moment thereon on high-load cutting and the cutting head 10 may rotate loosely.

On the other hand, where the inner diameter to outer diameter ratio d/D1, is less than 0.5, the leading end part of the holder main body 2 increases in thickness to improve in strength. Moreover, the leading end part is less likely to increase in diameter, resulting in an increase in contact pressure. However, the fitting part 4B is in contact with the attachment part 12 in a smaller inner diameter and a smaller outer diameter, that is, the contact diameter between the fitting part 4B and the attachment part 12 is small. Therefore, the cutting head 10 cannot be held against cutting torque or moment while high-load cutting the workpiece, and the cutting head 10 may rotate loosely.

Further, where the outer diameter expansion percentage (D2−D1)/D1×100 (%) of the leading end part of the holder main body 2 at the holder 1 before and after being fitted is in excess of 0.33×d/D1−0.06 with respect to the inner diameter to outer diameter ratio d/D1, the leading end part increases in diameter exceeding the tensile strength of the cemented carbide which forms the holder main body 2. Thus, an excessive tensile stress may act on the leading end part, resulting in breakage of the leading end part of the holder 1. On the other hand, where the outer diameter expansion percentage (D2−D1)/D1×100 (%) is lower than 0.022×d/D1−0.003 (%) with respect to the inner diameter to outer diameter ratio d/D1, the above-described wedge effects are insufficient, thus resulting in an insufficient contact pressure between the fitting part 4B and the attachment part 12. There are also fears that the cutting head 10 cannot be held stably and the cutting head 10 may rotate loosely.

In other words, in the thus constituted head replacement-type cutting tool, the inner diameter to outer diameter ratio d/D1 of the leading end part of the holder 1 and the outer diameter expansion percentage (D2−D1)/D1×100 (%) are set as described above. Thereby, the thickness necessary for the leading end part of the holder 1 is secured and, as will be explained with reference to an embodiment to be described later, in a range where a contact pressure capable of reliably holding the cutting head 10 is obtained between the attachment part 12 and the fitting part 4B, it is possible to prevent the holder main body 2 from undergoing excessively great deformation at the leading end part of the holder 1 before and after being fitted and also to prevent breakage of the holder 1.

Further, in the present embodiment, the holder main body 2 of the holder 1 is made of WC—Co based cemented carbide which is relatively rough and in which an average particle size of WC is from 1 μm to 5 μm and a binder phase quantity of Co as a major component is from 8 wt % to 20 wt %. Thereby, as described above, the holder main body 2 is increased in coefficient of thermal conductivity, thus making it possible to smoothly transmit and release cutting heat developed on the cutting head 10. It is also possible to improve fracture toughness of the holder 1 and to prevent breakage of the holder 1 resulting from impact while cutting the workpiece.

Here, the cemented carbide of ultrafine particles having an average particle size of WC smaller than 1 μm is unable to provide the above-described effects. On the other hand, the cemented carbide having an average particle size of WC greater than 5 μm is improved in fracture toughness but decreased in hardness. For example, the fitting part 4B is deteriorated in durability. Thus, in particular, where the cutting head 10 is made of the above-described cemented carbide of ultrafine particles higher in hardness, the cutting head 10 may be loosen with respect to the holder 1 instantly. Further, in the above-described WC—Co based cemented carbide having an average particle size of WC which is from 1 μm to 5 μm, where a binder phase quantity of Co as a major component is 8 wt % or more, it is possible to obtain a tensile strength of about 1.5 GPa or more. Thus, even on heavy cutting which is high in load, the holder can be sufficiently secured for the rigidity and strength. Although a greater binder phase quantity will improve the fracture toughness to a greater extent, the Young's modulus will be decreased to affect the rigidity. Thus, an upper limit is set to be 20 wt %.

On the other hand, in the present embodiment, the inner circumferential face of the fitting part 4B at the holder main body 2 of the holder 1 is relatively smooth in surface roughness in which a maximum height roughness Rz stipulated by the JIS B 0601: 2001 (ISO 42887: 1997) is 3.2 μm or lower. Thereby, the attachment part 12 of the cutting head 10 is firmly attached and taper-fitted evenly to the inner circumferential face of the fitting part 4B. Moreover, the cutting head 10 is reliably held by the above-described wedge effects. As a matter of course, it is desirable that the outer circumferential face of the attachment part 12 of the cutting head 10 which is firmly attached to the inner circumferential face of the fitting part 4B is also 3.2 μm or less in maximum height roughness Rz.

Further, in contrast, in the present embodiment, the leading end face 2B of the holder main body 2 is rougher in surface roughness than the inner circumferential face of the fitting part 4B, with the maximum height roughness Rz being up to 6.3 μm. Therefore, as described above, if such an attempt is made that the rear end face 11C of the cutting part 11 is in contact with the leading end face 2B and the male thread part 13 of the cutting head 10 is then screwed into the female thread part 3E of the attachment hole 4, a friction resistance increases. It is thus possible to prevent the attachment part 12 and the fitting part 4B from being excessively fastened. As a matter of course, it is desirable that the rear end face 11C of the cutting head 10 in contact with the leading end face 2B is also rougher in surface roughness than the outer circumferential face of the attachment part 12 or the inner circumferential face of the fitting part 4B in a range of the maximum height roughness Rz of 6.3 μm or less.

Further, as described above, the fitting part 4B of the attachment hole 4 and the attachment part 12 of the cutting head 10 are formed in a tapered shape. Moreover, where they are tapered to an excessively great extent, a component force may occur in a direction at which the cutting head 10 is pushed out from the attachment hole 4 on application of a contact pressure to the outer circumferential face of the attachment part 12 by the attachment part 12 taper-fitted to the fitting part 4B. In particular, as described in the present embodiment, where a twisted angle of the cutting edge 11A on the outer circumference side of the cutting part 11 is large, the male thread part 13 must be fitted tightly to the female thread part 3E to hold the cutting head 10 against a resultant force made up of the cutting force acting on the cutting edge 11A of the outer circumference side and the component force.

However, in contrast, where the fitting part 4B and the attachment part 12 are tapered at a taper rate of lower than 1/10 as described in the present embodiment, a smaller component force will occur in a direction at which the cutting head 10 is pushed out from the attachment hole 4 by taper-fitting on action of the same contact pressure. The cutting force acting on the cutting edge 11A is handled by a resultant force made up of a frictional force of the contact pressure and a fastening force by the female thread part 3E and the male thread part 13, thus making it possible to reduce the fastening force itself. As a result, it is possible to prevent the breakage effectively by reducing tensile stress acting on the leading end part of the holder main body 2 and also to hold the cutting head 10 more firmly.

Further, in the present embodiment, the attachment part 12 of the cutting head 10 is made hollow and inside thereof, that is, in the head-side attachment hole, there is housed the external thread member as a head-side coupling member which is made of a metal material lower in hardness than cemented carbide which forms the attachment part 12 of the cutting head 10. Therefore, when the attachment part 12 is taper-fitted into the fitting part 4B, the leading end part of the holder main body 2 increases in diameter and the attachment part 12 is also pressed from the outer circumference and decreases in inner diameter and outer diameter. Accordingly, the external thread member is also pressed from the outer circumference and also presses the attachment part 12 from the inner circumferential face due to its reaction force. Thus, the attachment part 12 can be firmly held between the external thread member and the leading end part of the holder main body 2 to hold the cutting head 10 more reliably.

Further, in the present embodiment, as described above, the male thread part 13 is formed on the member made of a material lower in hardness and housed in a hollow part of the attachment part 12. For example, as compared with a case where the thread part is made directly on the cutting head 10 made of the cemented carbide high in hardness but high in fragility, breakage of the screw thread can be prevented, and the need to give a special shape to the screw thread to prevent breakage is also eliminated. Therefore, it is possible to reduce costs. This is also true for the female thread part 3E made on the attachment hole 4 of the holder 1. That is, in the present embodiment, the female thread part 3E is also formed on the coupling member 3 which is made of a metal material lower in hardness but higher in ductility than cemented carbide of which the holder main body 2 is made. Since the coupling member 3 is housed in the attachment hole 4, no breakage of the screw thread is caused and it is not necessary to give a special shape to the screw thread.

Still further, as described above, in the coupling member 3 and the external thread member which are lower in hardness but higher in ductility than the holder main body 2, the cutting part 11 of the cutting head 10 and the attachment part 12, the outer circumferential face of the engaged part 3B thereof is firmly attached to the inner circumferential face of the engaging part 4D in the attachment hole 4 of the holder main body 2 and the inner circumferential face of the head-side attachment hole and engaged therewith so as to be fitted into a recessed part formed on the inner circumferential face thereof. That is, there is formed a raised part which has been fitted into the recessed part on the outer circumferential face of the engaged part 3B. Thereby, the coupling member 3 and the external thread member can be firmly attached to the attachment hole 4 and the head-side attachment hole and integrated into the holder main body 2, the cutting part 11 and the attachment part 12. As a result, loads, for example, while cutting the workpiece will not cause rattling of the cutting head 10. It is possible to facilitate stable cutting in association with high rigidity and strength of the holder main body 2.

In addition, in order for the coupling member 3 and the outer circumferential face of the engaged part 3B of the external thread member to be engaged with the recessed part on the inner circumferential face of the engaging part 4D in the attachment hole 4 and the recessed part on the inner circumferential face of the head-side attachment hole, in the present embodiment, each of the coupling member 3 and the external thread member are formed in a tubular shape. As described above, by using the blank 6 of the coupling member 3 and the external thread member in which the outer diameters of the engaged part 3B and the small inner-diameter part are made smaller than the inner diameters of the engaging part 4D and the head-side attachment hole, the press-fit member 7 having an outer diameter larger than the inner diameter of the small inner-diameter part is press-fitted into the press-fit hole part 6A on the inner circumferential face of the blank 6 and the small inner-diameter part of the external thread member. Thereby, the blank 6 and the external thread member are allowed to undergo plastic deformation so as to increase in diameter and firmly attached to the inner circumferential face of the engaging part 4D and the inner circumferential face of the head-side attachment hole. Thus, the engaged part 3B of the coupling member 3 and the small inner-diameter part of the external thread member can be engaged with these recessed parts.

Therefore, the outer circumferential faces of the blank 6 and the external thread member are uniformly and entirely pressed and firmly attached to the inner circumferential faces of the engaging part 4D and the head-side attachment hole, and the outer circumferential faces which have undergone plastic deformation can be evenly fitted into the recessed parts formed in the engaging part 4D and the head-side attachment hole and reliably engaged therewith. Moreover, in the holder 1, a screw pilot hole 3G and a female thread part 3E, each of which has a predetermined inner diameter at the center of the central axis O, are formed at the leading end side of the through hole part 3F which has increased in diameter from the press-fit hole part 6A of the blank 6, thereby as a coupling member 3. Thus, the coupling member 3 can be more firmly integrated with the holder main body 2. This is also true for the cutting head 10.

On the other hand, as described above, the coupling member 3 and the external thread member are engaged with these recessed parts and integrated with the holder main body 2, the cutting part 11, and the attachment part 12. However, they are only mechanically attached, and are not joined by soldering. Thus, for example, a jig, is used to apply an excessive tensile force in excess of an engagement force with the recessed parts to the coupling member 3 and the external thread member. Thereby, the coupling member 3 and the external thread member can be pulled out and separated from the attachment hole 4 and the head-side attachment hole. Therefore, even the head replacement-type cutting tool which is not usable in the case of, for example, breakage can be recovered by separating the coupling member 3 and the external thread member from the holder main body 2, the cutting part 11 and the attachment part 12 made of a material different from that of the coupling member 3 and the external thread member. Thus, they can be recycled easily.

Further, in the present embodiment, the recessed parts formed on the inner circumferential face of the engaging part 4D of the attachment hole 4 and on the inner circumferential face of the head-side attachment hole are such that each of the inner circumferential faces is as an irregular surface with a maximum height roughness Rz of 5 μm or more to 200 μm or less. Thereby, recesses of the irregular surface are used as the recessed parts. Therefore, the recessed parts are formed over the entire inner circumferential face of the engaging part 4D and the inner circumferential face of the head-side attachment hole. The outer circumferential face of the engaged part 3B of the coupling member 3 and the outer circumferential face of the small inner-diameter part of the external thread member, each of which has undergone plastic deformation as described above, are firmly attached to the thus formed recessed parts and engaged therewith. As a result, a great frictional force will occur between the inner circumferential face of the engaging part 4D and the outer circumferential face of the engaged part 3B and between the head-side attachment hole and the external thread member. Thus, it is possible to integrate the coupling member 3 with the holder main body 2 and also integrate the external thread member with the cutting part 11 and the attachment part 12 more stably and firmly.

For example, the inner circumferential face of the engaging part 4D in the attachment hole 4 of the holder main body 2 was adjusted to give a maximum height roughness Rz of 7.0 μm, and the outer circumferential face of the engaged part 313 of the blank 6 formed on the coupling member 3 was adjusted to give a maximum height roughness Rz of 2.0 μm. Moreover, as described in the embodiment, the press-fit member 7 was press-fitted into the blank 6 which was housed in the engaging part 4D and integrated with the holder main body 2. Thereafter, the holder main body 2 was broken to measure the surface roughness of the outer circumferential face of the engaged part 3B of the blank 6. At this time, it was confirmed that the maximum height roughness Rz was changed to 5.5 μM. Thereby, as described above, it has been found that the outer circumferential face of the blank 6 undergoes plastic deformation along the irregular surface of the inner circumferential face of the engaging part 4D.

Further, cemented carbide which forms the holder main body 2, the cutting part 11 and the attachment part 12 is a sintered material. Thus, a compressed powder body before sintering is processed in such a manner that faces as the inner circumferential face of the engaging part 4D and the inner circumferential face of the head-side attachment hole can attain surface roughness in the above-described range after sintering, a heating temperature and heating time on sintering are adjusted, and each of the inner circumferential faces thereof is polished after sintering to decrease the surface roughness, or the surface is made rough to increase the surface roughness. Alternatively, where each of the inner circumferential faces thereof after sintering is in the above-described range of surface roughness, the inner circumference is not polished, with a sintered surface kept as is. Thereby, it is possible to reliably adjust the inner circumferential face of the engaging part 4D and the inner circumferential face of the head-side attachment hole so as to attain the above-described surface roughness.

Here, in the present embodiment, in particular where a sintered material which forms the holder main body 2, the cutting part 11 and the attachment part 12 is WC—Co based cemented carbide and contains Co as a binding phase (binder) and also where the engaging part 4D in the attachment hole 4 of the holder main body 2 and the head-side attachment hole are not polished after sintering but a sintered surface is kept as is to adjust the surface roughness to the above-described range, a cobalt-rich region which contains Co abundantly is formed on a surface of the inner circumferential face of the engaging part 4D and a surface of the inner circumferential face of the head-side attachment hole. The cobalt-rich region is a region which will develop on the surfaces of the inner circumferential faces thereof by heating the compressed powder body in a sintering step of a sintered material. The region contains Co as a major component and has the thickness of about 0.5 μm to 5 μm. It is, therefore, acceptable that the irregular surface is formed so as to contain the cobalt-rich region.

Where the inner circumferential face of the engaging part 4D in the attachment hole 4 and the inner circumferential face of the head-side attachment hole are less than 5 μm in maximum height roughness Rz, there is a fear that due to an insufficient frictional force, the coupling member 3 and the external thread member may not be firmly integrated with the holder main body 2, the cutting part 11 and the attachment part 12. Further, in contrast, where they are more than 200 μm in maximum height roughness Rz, it may be difficult to insert the blank 6 and the small inner-diameter part of the external thread member into the attachment hole 4 and the head-side attachment hole. This is because in order for the outer circumferential face of the engaged part 3B and the outer circumferential face of the small inner-diameter part to be reliably engaged with the irregular surface which is formed as a recessed part of the blank 6 and for the external thread member to be allowed to undergo plastic deformation, it is necessary to reduce the difference between the inner diameters of the inner circumferential face of the engaging part 4D and the inner circumferential face of the head-side attachment hole and the outer diameters of the engaged part 3B of the blank 6 and the small inner-diameter part of the external thread member by as much as possible.

Further, in the present embodiment, the attachment screw part which is formed on the thus engaged coupling member 3 is the female thread part 3E and is screwed into the male thread part 13 acting as a head-side screw part which is formed on the cutting head 10. Moreover, in the attachment state where the coupling member 3 is engaged with the engaging part 4D in the attachment hole 4 and attached to the holder main body 2, in the present embodiment, the female thread part 3E extends from the leading end of the coupling member 3 up to a site exceeding ½ of the length of the engaging part 4D in the direction of the central axis O. In other words, an area at which the female thread part 3E is formed is allowed to overlap on a range at which the engaged part 3B is engaged with the engaging part 4D in the direction of the central axis O on an inner circumference and an outer circumference of the coupling member 3.

Therefore, on the inner circumference of the engaged part 3B of the coupling member 3 which is engaged with the engaging part 4D of the attachment hole 4, the cutting head 10 is attached by screwing the male thread part 13 into the female thread part 3E. As a result, even where a cutting force acting from the cutting part 11 of the cutting head 10 while cutting the workpiece is transmitted to the male thread part 13, the force can be received via the engaged part 3B on the outer circumference of the female thread part 3E by the engaging part 4D. It is possible to support the cutting head 10 more stably and to carry out smooth cutting.

However, in the present embodiment, the attachment screw part of the holder 1 is as the female thread part 3E, while the head-side screw part of the cutting head 10 is as the male thread part 13. In contrast, the attachment screw part of the holder 1 can be as the male thread part, while the head-side screw part can be as the female thread part.

In this case, in a similar manner as the external thread member made of a material different from that of the cutting part 11 and the attachment part 12 is attached to the cutting part 11 and the attachment part 12 of the cutting head 10, it is acceptable that a cylindrical coupling member having a male thread part on an outer circumference of the leading end part is housed into the engaging part 4D of the attachment hole 4 and a press-fit member is press-fitted into the inner circumferential part of the engaging part 4D to give plastic deformation to the coupling member, by which the outer circumferential part of the coupling member is engaged with the engaging part 4D.

Still further, in the present embodiment, a recessed site 4E is formed at the deepest part of the attachment hole 4 of the holder 1 and a detent part 3C is formed at the rear end of the coupling member 3. The recessed site 4E and the detent part 3C are respectively provided with a wall face 4G and a side face 3D, each having a straight-line cross section orthogonal to the central axis O. Next, in the attachment state with the coupling member 3 attached, the wall face 4G is opposed to the side face 3D and the detent part 3C is housed in the recessed site 4E. Thus, the coupling member 3 is, if attempted to rotate around the central axis O, restrained from rotation around the central axis O also due to the fact that the side face 3D of the detent part 3C is in contact with the wall face 4G of the recessed site 4E. Even where an excessively large cutting force is applied from the cutting head 10 to the coupling member 3 while cutting the workpiece, the coupling member 3 rotates loosely inside the attachment hole 4, thus making it possible to prevent dropping thereof together with the cutting head 10 due to disengagement from the recessed part.

In the present embodiment, the detent part 3C is formed so as to give an ellipse shaped-cross section, the pair of side faces 3D are formed parallel with each other and also parallel with the central axis O. These side faces 3D are opposed and allowed to be in contact with the pair of wall faces 4G of the recessed site 4E, each of which is also formed to give an ellipse shaped-cross section. Moreover, as shown in the modified example of FIG. 6(*a*), the recessed site 4E is formed so that a cross section orthogonal to the central axis O is formed substantially in a square shape, thereby forming two pairs of wall faces 4G in which wall faces 4G adjacent in a circumferential direction are kept orthogonal with each other. As for the detent part 3C, it is acceptable that, as shown in the modified examples of FIGS. 6(*b*) and (*c*), there are formed two pairs of side faces 3D so that side faces 3D adjacent with each other are allowed to be orthogonal in a circumferential direction. It is also acceptable that the side faces 3D are opposed and allowed to be in contact with the wall faces 4G, thereby restraining rotation of the coupling member 3.

Further, as long as the side face 3D and the wall face 4G are formed in the shape of a straight line on a cross section orthogonal to the central axis O, opposed and in contact with each other, thus making it possible to restrain rotation of the coupling member 3, it is acceptable that the side face 3D and the wall face 4G are provided by one, three or five or more each. It is also acceptable that each of them is formed in the shape of an inclined flat face or a curved face which moves to the central axis O with movement to the rear end thereof. Still further, in the present embodiment, when the press-fit member 7 is press-fitted into a press-fit hole part 6A of the blank 6 of the coupling member 3, a large diameter part 7B of the press-fit member 7 is stopped and pulled out around the rear end of the engaged part 313 of the press-fit hole part 6A so that the large diameter part 7B thereof will not reach the detent part 3C housed in the recessed site 4E. The side face 3D is not in contact with the wall face 4G but opposed thereto, with the side face 3D and the wall face 4G are positions in a circumferential direction being in alignment, and they are to be in contact with each other to act as a detent when the coupling member 3 rotates with respect to the wall face 4G. However, as described above, if there is no fear that the press-fit member 7 may interfere with the holder main body 2, it is acceptable that the press-fit member 7 is press-fitted up to a site at which the large diameter part 7B is pulled out from the rear end of the press-fit hole part 6A, and the detent part 3C of the blank 6 is also allowed to undergo plastic deformation to increase a diameter, thereby the side face 3D is from the start firmly attached on the wall face 4G and brought into contact therewith.

Figure 6:
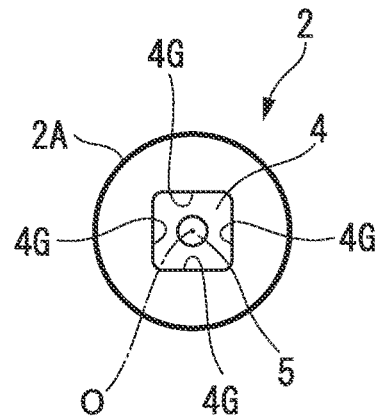
FIG. 6(a) is a drawing which corresponds to the sectional view taken along the line Z to Z in FIG. 3(a) which shows the holder main body of a modified example of the embodiment shown in FIG. 1.
FIG. 6(b) is a perspective view which shows the blank before the coupling member is allowed to undergo plastic deformation.
FIG. 6(c) is a perspective view which shows the coupling member after an attachment screw part is formed by allowing the blank shown in FIG. 6(b) to undergo plastic deformation (that is, a drawing which shows the coupling member itself which is housed into the attachment hole of the holder and formed in an integrated manner).
Figure 6:
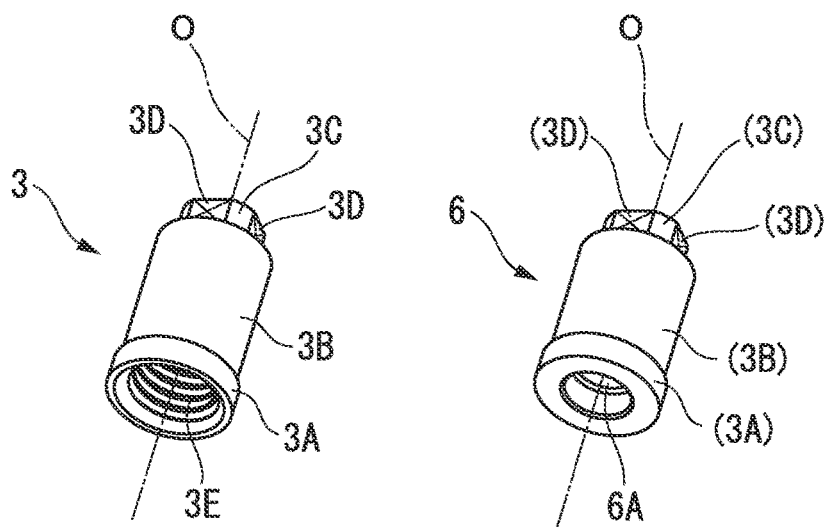

In the above-described embodiment and in the modified example shown in FIG. 6, the detent part 3C is formed at the rearmost end of the coupling member 3 and housed at the recessed site 4E formed at the deepest part of the attachment hole 4, and the side face 3D and the wall face 4G which are formed respectively at the detent part 3C and the recessed site 4E are allowed to be in contact with each other. Moreover, for example, a flat face-like side face extending parallel with the central axis O is formed on the engaged part 3B of the coupling member 3 and a flat face-like wall face extending parallel to the central axis O so as to be opposed to the side face is formed on the engaging part 4D of the attachment hole 4, and when the blank 6 of the coupling member 3 is allowed to undergo plastic deformation, the side face and the wall face are firmly attached and in contact with each other, thus making it possible to stop rotation of the coupling member 3.

In the above-described cutting head 10, the head-side attachment hole having a recessed part on the inner circumferential face thereof is formed at the cutting part 11 and the attachment part 12, so as to run along the central axis O. Moreover, the external thread member as a head-side coupling member on which the male thread part 13 is formed is housed into the head-side attachment hole, and a press-fit member is press-fitted into the press-fit hole part thereof. Thereby, the outer circumferential face is firmly attached on the inner circumferential face of the head-side attachment hole and engaged with the recessed part. In this case, the head-side attachment hole and the press-fit hole part are formed on the replacement-type cutting head 10. Therefore, formation of a coolant hole which is communicatively connected to them and opened on the surface of the cutting part 11 will make it possible to supply coolant from a machine tool side via the through hole 5 of the holder main body 2 of the holder for head replacement-type cutting tool 1, the recessed site 4E, the through hole part 3F of the coupling member 3 and the female thread part 3E. It is, thereby, possible to cool the cutting edge 11A of the cutting part 11 efficiently.

In the present embodiment, the coupling member 3 is formed in a tubular shape in which the through hole part 3F is installed to penetrate through the inner circumferential part so that the coolant can be supplied as described above. However, it is acceptable that the coupling member is formed in a closed-end tubular shape in which the through hole part 3F is a closed end hole that is closed by the detent part 3C at the rear end thereof. In this case, as described above, when the press-fit member 7 is press-fitted into the press-fit hole part 6A of the blank 6 of the coupling member 3, it is acceptable that the press-fit member 7 is stopped in the midstream and pulled out so that the large diameter part 7B of the press-fit member 7 will not reach the closed detent part 3C. This is also true for a case where the external thread member is engaged with the head-side attachment hole in the cutting head 10.

EXAMPLES

Moreover, a description will be provided of the inner diameter to outer diameter ratio d/D1 of the holder 1 in the present invention and the outer diameter expansion percentage (D2−D1)/D1×100 (%) with reference to examples. In the present example, based on the head replacement-type cutting tool (head replacement-type end mill) of the above-described embodiment, at first, two types of head replacement-type cutting tools which were 0.01 m (10 mm) and 0.02 m (20 mm) in outer diameter D1 of the leading end part of the holder main body 2 of the holder 1 in a state before the attachment part 12 of the cutting head 10 was fitted were used to calculate a case where allowable torque with respect to the inner diameter to outer diameter ratio d/D1 upon change in inner diameter d of the fitting part 4B at the opening part of the attachment hole 4 was designed so that stress developing on the holder 1 as a minimum in use for cutting was 100 MPa (for example, for light cutting) and a case where the torque was designed so that stress developing on the holder 1 as a maximum strength of the cemented carbide was 1.5 GPa (for example, for heavy cutting).

That is, it is considered that the allowable torque which is torque transmittable between the cutting head 10 and the holder 1 may change depending on the inner diameter d. Thus, an allowable stress was set for stress of the inner circumferential face of the fitting part 4B of the holder 1 in a circumferential direction and an interference δ was determined so as to attain the allowable stress. Moreover, a contact pressure P was calculated from the interference δ and the allowable torque T was calculated by referring to the following Formula 1. However, in the above-described embodiment, for example, where a taper rate is 1/14 which is smaller than 1/10, it is possible to disregard influences of an inclination made by the inner circumferential face of the fitting part 4B and the outer circumferential face of the attachment part 12 with respect to the central axis O. Therefore, on analysis, they were subjected to modeling by using a cylindrical face at the center of the central axis O and an interference fit analysis was used. It is noted that in Formula 1, L (m) represents the contact length between the fitting part 4B and the attachment part 12 in the direction of the central axis O and is as 0.5×D1, and μ represents the coefficient of friction between the fitting part 4B and the attachment part 12 and is as 0.15.

[Formula 1]

$$T = P \times \pi \times d \times L \times \mu \times (d/2) \quad \text{[Formula 1]}$$

Further, an interference δ (m) and a contact pressure P (Pa) are calculated with reference to the following Formula 2. A circumferential direction stress σθ (Pa) of the inner circumferential face of the fitting part 4B is calculated with reference to the following Formula 3. A radial displacement u (m) of the leading end part of the holder main body 2 is calculated with reference to the following Formula 4. Here, in Formulae 2 to 4, E1 depicts a Young's modulus of the attachment part 12 of the cutting head 10 and is given as 580 GPa. E2 depicts a Young's modulus of the leading end part of the holder main body 2 and is given as 560 GPa. Further, ν1 depicts a Poisson ratio of the attachment part 12 of the cutting head 10 and is given as 0.21. Moreover, ν2 depicts a Poisson ratio of the leading end part of the holder main body 2 and is given as 0.22.

Further, ra (m) depicts a radius of the head-side attachment hole which is formed at the attachment part 12, rb (m) depicts a radius of the base end of the attachment part 12 (radius of a circle made by an intersecting line between the outer circumferential face of the attachment part 12 and the rear end face 11C of the cutting part 11), rc (m) depicts a radius (d/2) of the attachment hole 4 at the opening part side of the fitting part 4B, rd (m) depicts a radius (D1/2) of the outer diameter D1 of the leading end part of the holder main body 1, each of which is a radius before being fitted. Further, the interference δ depicts a difference in diameter (2×rb−2×rc or 2×rb−d) between the base end of the attachment part 12 and the fitting part 4B at the opening part of the attachment hole 4 before the attachment part 12 is fitted into the fitting part 4B. That is, the diameter (2×rb) at the base end of the attachment part 12 is a dimension which is obtained by adding the interference δ to the inner diameter d of the fitting part 4B at the opening part of the attachment hole 4.

[Formula 2]

$$P = \frac{\delta}{2\left(\frac{1}{E1}rb\left(\frac{ra^2+rb^2}{rb^2-ra^2}-\nu1\right)+\frac{1}{E2}rc\left(\frac{rc^2+rd^2}{rd^2-rc^2}+\nu2\right)\right)} \quad \text{[Formula 2]}$$

[Formula 3]

$$\sigma\theta = \frac{rc^2+rd^2}{rd^2-rc^2}P \quad \text{[Formula 3]}$$

[Formula 4]

$$u = \frac{2}{E2}\frac{rc^2 rd}{rd^2-rc^2}P \quad \text{[Formula 4]}$$

Figure 7:
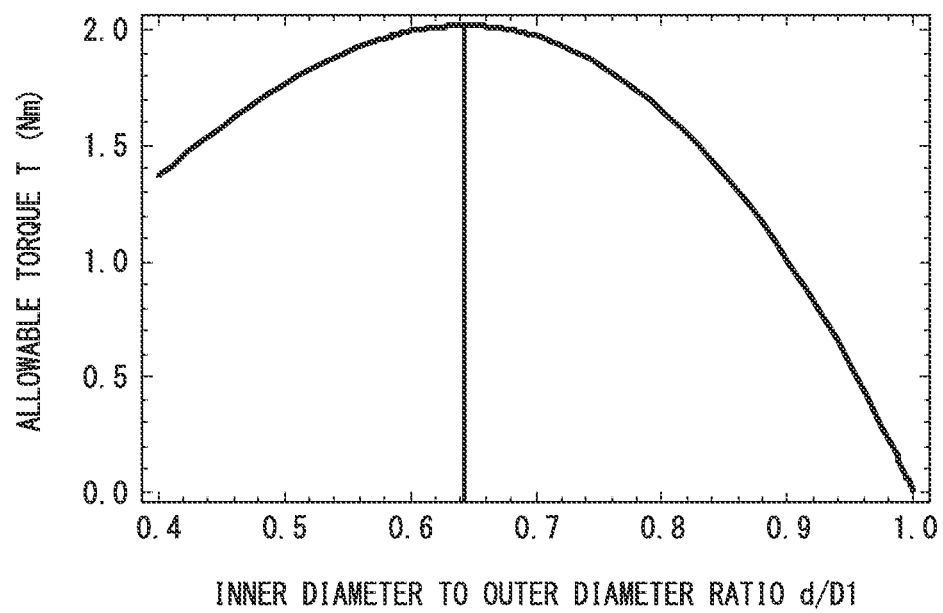
FIG. 7 is a graph which shows a relationship between an inner diameter to outer diameter ratio d/D1 and allowable torque T where the leading end part of the holder main body is 10 mm in outer diameter D1 and design stress is 100 MPa.
Figure 8:
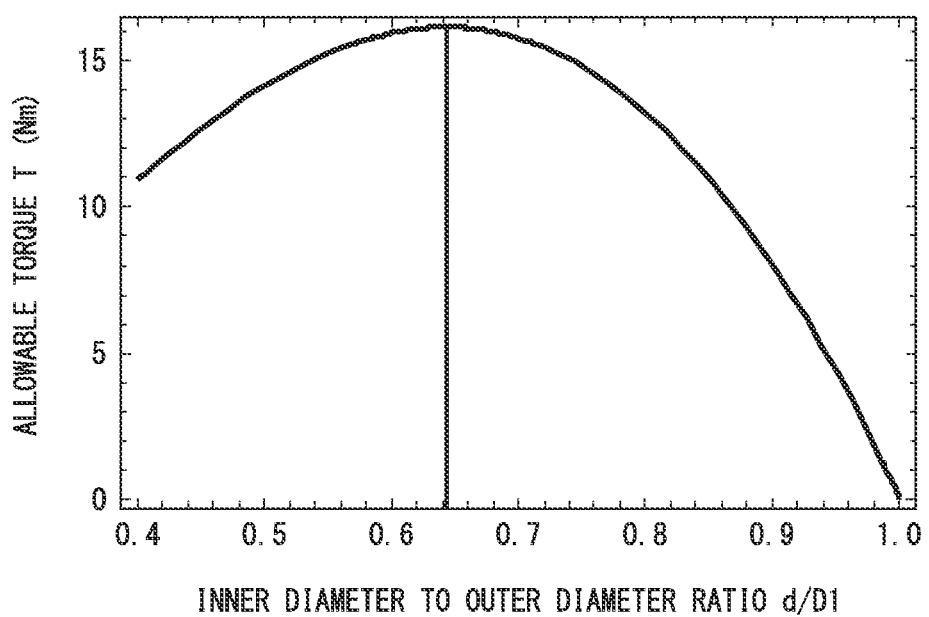
FIG. 8 is a graph which shows a relationship between an inner diameter to outer diameter ratio d/D1, and allowable torque T where the leading end part of the holder main body is 20 mm in outer diameter D1 and design stress is 100 MPa.
Figure 9:
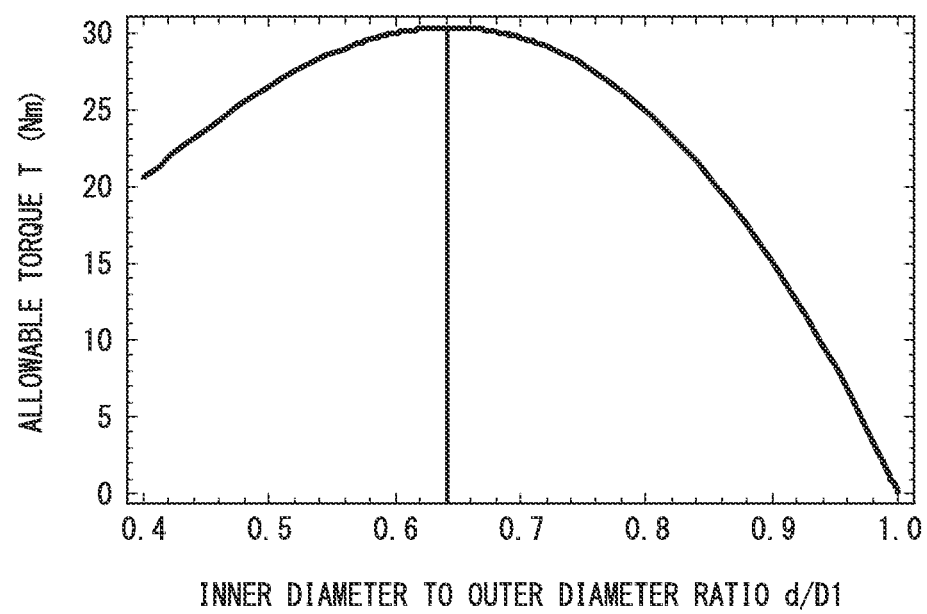
FIG. 9 is a graph which shows a relationship between an inner diameter to outer diameter ratio d/D1 and allowable torque T where the leading end part of the holder main body is 10 mm in outer diameter D1 and design stress is 1.5 GPa.
Figure 10:
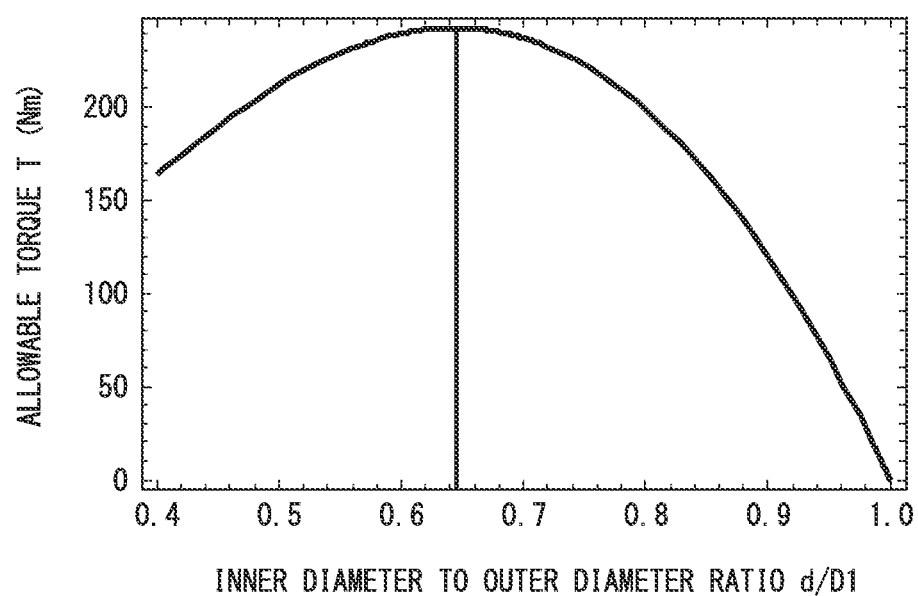
FIG. 10 is a graph which shows a relationship between an inner diameter to outer diameter ratio d/D1 and allowable torque T where the leading end part of the holder main body is 20 mm in outer diameter D1 and design stress is 1.5 GPa.

The above results were shown as follows. Upon the conditions that the inner diameter to outer diameter ratio of the holder 1, d/D1, was allowed to change in a range of 0.4 to 1.0, FIG. 7 showed a case where the outer diameter D1 was 10 mm and the design stress was 100 MPa, FIG. 8 showed a case where the outer diameter D1 was 20 mm and the design stress was 100 MPa, FIG. 9 showed a case where the outer diameter D1 was 10 mm and the design stress was 1.5 GPa, and FIG. 10 showed a case where the outer diameter D1was 20 mm and the design stress was 1.5 GPa. In FIG. 7 to FIG. 10, ra was given as 0.002 m (2 mm) for the outer diameter D1 of 10 mm, and ra was given as 0.004 m (4 mm) for the outer diameter D1 of 20 mm.

From the results shown in FIG. 7 to FIG. 10, it has been found that where the outer diameter D1 is 0.01 m (10 mm) or 0.02 m (20 mm) and also where the design stress is 100 MPa or 1.5 GPa, the highest allowable torque is exhibited in the vicinity of 0.65 of the inner diameter to outer diameter ratio of the holder 1, d/D1. It has been considered that the cutting head 10 can be reliably held in a range of 0.5 to 0.8.

Next, under conditions that the outer diameter D1 was 0.02 m (20 mm) and the design stress was 100 MPa, cutting tests were conducted by using five types of head replacement-type cutting tools in which the inner diameter to outer diameter ratio d/D1, was allowed to change in a range of 0.45 to 0.85. Whether loose rotation of the cutting head 10 (fastening of the cutting head 10 by cutting resistance) was found or not was confirmed to demonstrate whether or not the cutting head 10 was reliably held. In this case, each of the inner circumferential face of the fitting part 4B and the outer circumferential face of the attachment part 12 was tapered at a taper rate of 1/14 (at an inclination angle of 2° with respect to the central axis O) as described in the above embodiment. Table 1 shown below covers the results of Examples 1 to 3 in which three different values of the inner diameter to outer diameter ratio d/D1 are included in a range of 0.5 to 0.8 and Comparative Examples 1 and 2 in which the other values of the inner diameter to outer diameter ratio d/D1 are excluded in the above range, together with results covering the interference δ (mm) and the allowable torque T (Nm) for the purpose of calculation.

In the cutting test, the cutting head 10 was a square end mill having four edges, and carbon steel (hardness, 220HB) was used as a workpiece. Further, cutting was carried out under conditions where the rotating speed of a main shaft was 3180 min$^{-1}$, groove cutting was performed with axial cutting of 10 mm and radial cutting of 20 mm, feeding per edge was 0.05 mm/t, and 14 Nm cutting torque was for the purpose of calculation. Still further, cutting length was 0.3 m and dry cutting was performed.

In Table 1 covering the test results, a circle indicates no loose rotation and an x mark indicates loose rotation. Further, the loose rotation was confirmed by procedures in which the cutting head 10 was screwed to such an extent that it was slightly screwed after contact of the rear end face 11C of the cutting part 11 with the leading end face 2B of the holder main body 2, the leading end part of the holder main body 2 was matched to the outer circumferential face of the flange part 11D behind the leading end face 2B and the rear end face 11C, matched parts were marked, and the loose rotation was judged to occur if any deviation was found after cutting. From the results of Table 1, it is confirmed that no loose rotation took place in Examples 1 to 3 where the inner diameter to outer diameter ratio d/D1 was in a range of 0.5 to 0.8.

TABLE 1

| Inner diameter to outer diameter ratio d/D1 | Fastening extent δ [mm] | Allowable torque T for the purpose of calculation. [Nm] | Test results |
| --- | --- | --- | --- |
| 0.45 | 0.0010 | 12.7 | X |
| 0.5 | 0.007 | 14.1 | ○ |
| 0.65 | 0.004 | 16.2 | ○ |
| 0.8 | 0.004 | 13.2 | ○ |
| 0.85 | 0.004 | 11.0 | X |

Based on the above results, an evaluation was made for the outer diameter expansion percentage (D2−D1)/D1×100 (%). That is, according to the results of Table 1, it was possible to carry out cutting at such a contact pressure that stress developing on the holder 1 was 100 MPa. Thus, a lower limit of the design stress was 100 MPa.

On the other hand, an upper limit of the design stress is up to tensile strength of the cemented carbide which forms the holder main body 2, that is, about 1.5 GPa. Here, in order to produce a contact pressure P, an interference δ is imparted and the attachment part 12 is fastened by the fitting part 4B. Moreover, tensile stress occurs at the leading end part of the holder main body 2. Moreover, the outer diameter of the leading end part of the holder main body 2 is enlarged from the value D1 before being fitted to the value D2 after being fitted in proportion to the tensile stress.

Figure 11:
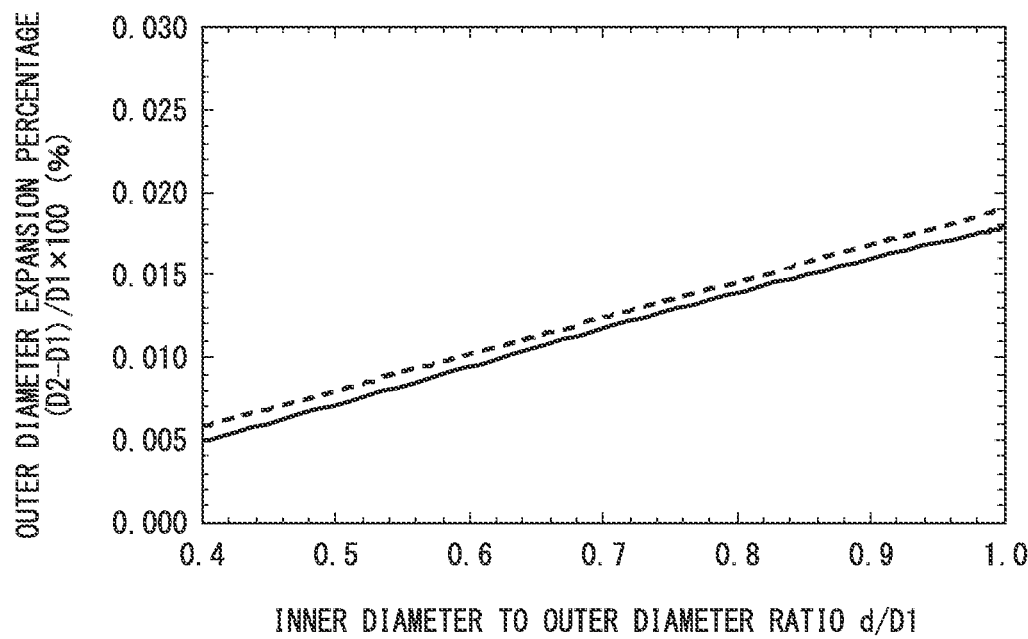
FIG. 11 is a graph which shows a relationship between an inner diameter to outer diameter ratio d/D1 and an outer diameter expansion percentage (D2−D1)/D1×100 (%) where the leading end part of the holder main body is 10 mm in outer diameter D1 and design stress is 100 MPa.
Figure 12:
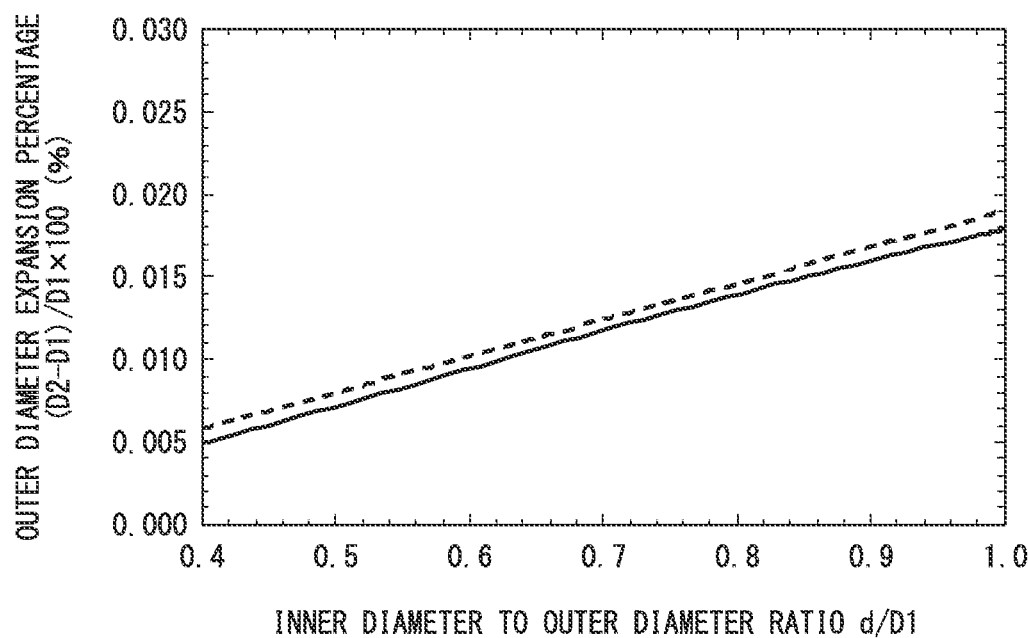
FIG. 12 is a graph which shows a relationship between an inner diameter to outer diameter ratio d/D1 and an outer diameter expansion percentage (D2−D1)/D1×100 (%) where the leading end part of the holder main body is 20 mm in outer diameter D1 and design stress is 100 MPa.
Figure 13:
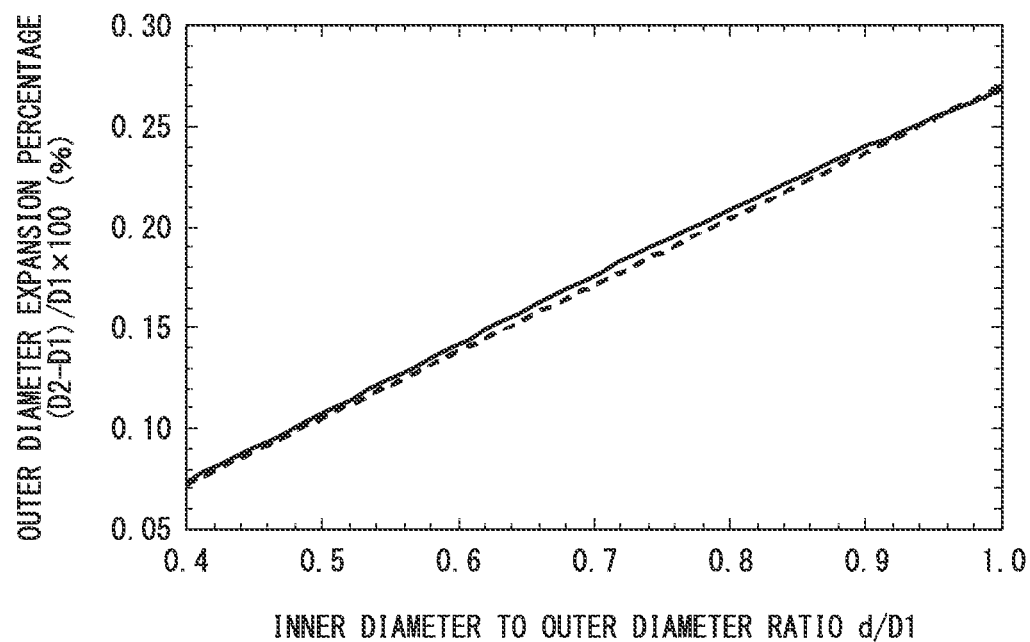
FIG. 13 is a graph which shows a relationship between an inner diameter to outer diameter ratio d/D1 and an outer diameter expansion percentage (D2−D1)/D1×100 (%) where the leading end part of the holder main body is 10 mm in outer diameter D1 and design stress is 1.5 GPa.
Figure 14:
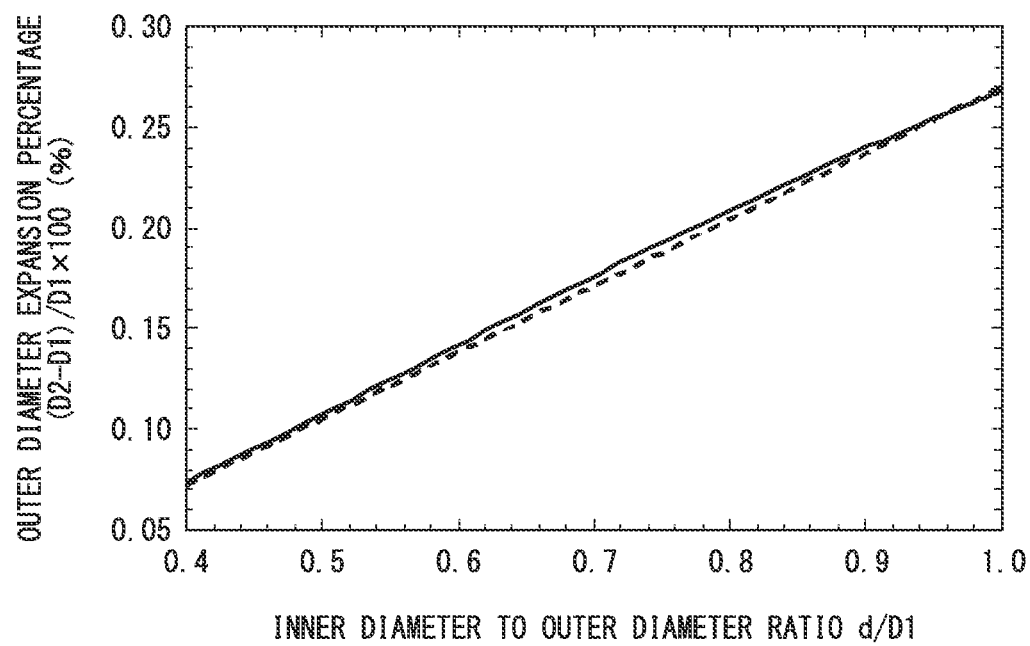
FIG. 14 is a graph which shows the relationship between an inner diameter to outer diameter ratio d/D1 and an outer diameter expansion percentage (D2−D1)/D1×100 (%) where the leading end part of the holder main body is 20 mm in outer diameter D1 and design stress is 1.5 GPa.

Therefore, analysis was made for how the outer diameter expansion percentage (D2−D1)/D1×100 (%) formed by the increased quantity of the outer diameters D2−D1 with respect to the outer diameter D1 before being fitted was changed in a case where the design stress was 100 MPa and a case where it was 1.5 GPa with reference to a case where the outer diameter D1 was 0.01 (10 mm) and a case where it was 0.02 m (20 mm) with respect to the inner diameter to outer diameter ratio d/D1. The analysis results were shown as follows. FIG. 11 showed a case where the outer diameter D1 was 10 mm and the design stress was 100 MPa, FIG. 12 showed a case where the outer diameter D1 was 20 mm and the design stress was 100 MPa, FIG. 13 showed a case where the outer diameter D1 was 10 mm and the design stress was 1.5 GPa, and FIG. 14 shows a case where the outer diameter D1 was 20 mm and the design stress was 1.5 GPa.

It is noted that in FIG. 11 to FIG. 14, a radius ra of the head-side attachment hole was 0.002 m (2 mm) for the outer diameter, D1, of 10 mm and was 0.004 m (4 mm) for the outer diameter D1 of 20 mm. Further, in FIG. 11 to FIG. 14, the solid line indicates an analysis result itself, while the broken line indicates a result obtained by approximating the analysis result by a straight line. Where the design stress was 100 MPa, the result was 0.022×d/D1−0.003 (%) with respect to the inner diameter to outer diameter ratio d/D1. Where the design stress was 1.5 GPa, the result was 0.33×d/D1−0.06 (%) with respect to the inner diameter to outer diameter ratio d/D1.

Therefore, from the results shown in FIG. 11 to FIG. 14, as described above, where the outer diameter expansion percentage (D2−D1)/D1×100 (%) is in a range of 0.022×d/D1−0.003 (%) to 0.33×d/D1−0.06 (%) with respect to the inner diameter to outer diameter ratio d/D1, there is no chance that loose rotation occurs and it is possible to reliably hold the cutting head 10. It is also possible to prevent breakage of the holder main body 2 without causing stress in excess of the tensile strength of the holder main body 2 made of the cemented carbide.

Thus, cutting tests were carried out by using head replacement-type cutting tools of examples in which the outer diameter expansion percentage (D2−D1)/D1×100 (%) was in a range of 0.022×d/D1−0.003 (%) to 0.33×d/D1−0.06 (%) with respect to the inner diameter to outer diameter ratio d/D1 and also by using head replacement-type cutting tools of comparative examples in which the percentage was out of the range. In any of the examples, there was found no loose rotation of the cutting head 10 or breakage of the leading end part of the holder main body 2, and it was possible to carry out cutting. In contrast, in a comparative example in which the outer diameter expansion percentage was smaller than the range, the cutting head rotated loosely. Further, in a comparative example in which the outer diameter expansion percentage was larger than the range, when the cutting head was screwed, the leading end part of the holder main body was broken, and it was impossible to carry out the cutting test itself.

INDUSTRIAL APPLICABILITY

The present invention relates to a head replacement-type cutting tool which is provided with a cutting head having a cutting part and a holder which has a cylindrical leading end part and in which the cutting head is attached in a detachable manner to an attachment hole formed at the leading end part.

According to the present invention, it is possible to reliably hold the cutting head while the operation is performed with high-load.

DESCRIPTION OF REFERENCE SIGNS

1: holder
2: holder main body
2A: neck part
2B: leading end face of holder main body 2
3: coupling member
3B: engaged part
3C: detent part
3D: side face of detent part 3C
3E: female thread part (attachment screw part)
3F: through hole part
3G: screw pilot hole
4: attachment hole
4B: fitting part
4D: engaging part
4E: recessed site
4G: wall face of recessed site 4E
5: through hole
6: blank of coupling member 3
6A: press-fit hole part
7: press-fit member
10: cutting head
11: cutting part
11A: cutting edge
11C: rear end face of cutting part 11
12: attachment part
13: male thread part (head-side screw part)
O: central axis of holder main body 2 (central axis of attachment hole 4)

The invention claimed is:

1. A head replacement-type cutting tool, comprising:
a cutting head having a cutting part; and
a holder which has a cylindrical leading end part and in which the cutting head is to be attached in a detachable manner to an attachment hole formed on the leading end part of the holder; wherein
a fitting part is formed on the attachment hole so as to be in a tapered shape which gradually increases in the inner diameter as close to an opening part of the attachment hole,
a peripheral border of the opening part on a leading end face of the holder is perpendicular to a central axis of the attachment hole,
at least the leading end face and the fitting part of the holder are made of a cemented carbide,
a taper-shaped attachment part fitted to the fitting part is formed on the cutting head so as to protrude from a rear end face of the cutting part and to be coaxial with the central axis,
the rear end face of the cutting part is perpendicular to the central axis,
at least the attachment part of the cutting head and the rear end face of the cutting part are made of the cemented carbide,
the cutting head is attached to the holder in such a manner that a male thread part and a female thread part installed respectively are engaged with each other at the center of the central axis thereby the attachment part is fitted into the fitting part, and the leading end face is in contact with the rear end face,
an inner diameter to outer diameter ratio d/D1 which is a ratio of an inner diameter d of the fitting part at the opening part of the attachment hole in a state before the attachment part is fitted into the fitting part in relation to an outer diameter D1 of the leading end part of the holder is in a range of 0.5 to 0.8, and
an outer diameter expansion percentage of the leading end part of the holder (D2−D1)/D1×100 (%) satisfies, $$0.022 \times \frac{d}{D1} - 0.003(\%) \leq \frac{D2-D1}{D1} \times 100(\%) \leq 0.33 \times \frac{d}{D1} - 0.06(\%)$$

wherein D1 is the outer diameter of the leading end part of the holder before the attachment part is fitted into the fitting part, and
D2 is the outer diameter of the leading end part of the holder in a state where the attachment part is fitted into the fitting part and the cutting head is attached to the holder.

2. The head replacement-type cutting tool according to claim 1, wherein the cemented carbide which forms at least the leading end face and the fitting part of the holder is a WC—Co based cemented carbide with an average particle size of 1 μm to 5 μm, and a binder phase quantity of Co as a major component is from 8 wt % to 20 wt %.

3. The head replacement-type cutting tool according to claim 1, wherein an inner circumferential face of the attachment hole at the fitting part of the holder is 3.2 μm or less in maximum height roughness Rz,
the peripheral border of the opening part on the leading end face of the holder has a maximum height roughness Rz of equal to or greater than the maximum height roughness of the inner circumferential face of the attachment hole and 6.3 μm or less.

4. The head replacement-type cutting tool according to claim 1, wherein the attachment part of the cutting head is made hollow, in which housed is a member made of a metal material lower in hardness than cemented carbide which forms the attachment part of the cutting head.

5. The head replacement-type cutting tool according to claim 1, wherein the fitting part and the attachment hole, each of which is formed in a tapered shape, are tapered at a taper rate of lower than 1/10.

6. The head replacement-type cutting tool according to claim 2, wherein an inner circumferential face of the attachment hole at the fitting part of the holder is 3.2 μm or less in maximum height roughness Rz,
the peripheral border of the opening part on the leading end face of the holder has a maximum height roughness Rz of equal to or greater than the maximum height roughness of the inner circumferential face of the attachment hole and 6.3 μm or less.

7. The head replacement-type cutting tool according to claim 2, wherein the attachment part of the cutting head is made hollow, in which housed is a member made of a metal material lower in hardness than cemented carbide which forms the attachment part of the cutting head.

8. The head replacement-type cutting tool according to claim 3, wherein the attachment part of the cutting head is made hollow, in which housed is a member made of a metal material lower in hardness than cemented carbide which forms the attachment part of the cutting head.

9. The head replacement-type cutting tool according to claim 6, wherein the attachment part of the cutting head is made hollow, in which housed is a member made of a metal material lower in hardness than cemented carbide which forms the attachment part of the cutting head.

10. The head replacement-type cutting tool according to claim 2, wherein the fitting part and the attachment hole, each of which is formed in a tapered shape, are tapered at a taper rate of lower than 1/10.

11. The head replacement-type cutting tool according to claim 3, wherein the fitting part and the attachment hole, each of which is formed in a tapered shape, are tapered at a taper rate of lower than 1/10.

12. The head replacement-type cutting tool according to claim 4, wherein the fitting part and the attachment hole, each of which is formed in a tapered shape, are tapered at a taper rate of lower than 1/10.

13. The head replacement-type cutting tool according to claim 6, wherein the fitting part and the attachment hole, each of which is formed in a tapered shape, are tapered at a taper rate of lower than 1/10.

14. The head replacement-type cutting tool according to claim 7, wherein the fitting part and the attachment hole, each of which is formed in a tapered shape, are tapered at a taper rate of lower than 1/10.

15. The head replacement-type cutting tool according to claim 8, wherein the fitting part and the attachment hole, each of which is formed in a tapered shape, are tapered at a taper rate of lower than 1/10.

16. The head replacement-type cutting tool according to claim 9, wherein the fitting part and the attachment hole, each of which is formed in a tapered shape, are tapered at a taper rate of lower than 1/10.

* * * * *